(12) United States Patent
Hahn et al.

(10) Patent No.: US 12,294,998 B2
(45) Date of Patent: May 6, 2025

(54) METHOD FOR CONFIGURING SIDELINK RESOURCE IN COMMUNICATION SYSTEM

(71) Applicants: Hyundai Motor Company, Seoul (KR); Kia Corporation, Seoul (KR)

(72) Inventors: Gene Back Hahn, Gyeonggi-do (KR); In Yong Jung, Gyeonggi-do (KR); Hyuk Min Son, Iksan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 347 days.

(21) Appl. No.: 17/635,885

(22) PCT Filed: Jul. 29, 2020

(86) PCT No.: PCT/KR2020/010016
§ 371 (c)(1),
(2) Date: Feb. 16, 2022

(87) PCT Pub. No.: WO2021/033945
PCT Pub. Date: Feb. 25, 2021

(65) Prior Publication Data
US 2022/0304032 A1    Sep. 22, 2022

Related U.S. Application Data

(60) Provisional application No. 62/913,387, filed on Oct. 10, 2019, provisional application No. 62/887,904, filed on Aug. 16, 2019.

(51) Int. Cl.
*H04W 72/20*    (2023.01)
*H04W 72/0446*    (2023.01)
(Continued)

(52) U.S. Cl.
CPC ....... *H04W 72/20* (2023.01); *H04W 72/0446* (2013.01); *H04W 72/0453* (2013.01); *H04W 72/1263* (2013.01)

(58) Field of Classification Search
CPC ..... H04L 5/001; H04L 5/0044; H04L 5/0048; H04L 5/005; H04L 5/0051; H04L 5/0053;
(Continued)

(56) References Cited

U.S. PATENT DOCUMENTS 9,942,933 B2    4/2018    Matsumoto et al.
2016/0338127 A1   11/2016   Matsumoto et al.
(Continued)

FOREIGN PATENT DOCUMENTS

| CN | 108886786 A | 11/2018 |
| KR | 10-2017-0020697 A | 2/2017 |
| WO | 2017/078783 A1 | 5/2017 |

OTHER PUBLICATIONS

"Discussion of physical layer structure for sidelink", Nokia, Nokia Shanghai Bell, R1-1905332, 3GPP TSG RAN WG1 #96 Xi'an, China, Apr. 8-12, 2019,15 pages.
(Continued)

*Primary Examiner* — Thomas R Cairns
(74) *Attorney, Agent, or Firm* — Fox Rothschild LLP

(57) ABSTRACT

Disclosed is a method for configuring a sidelink resource in a communication system. An operation method of a first terminal comprises the steps of: generating SCI #n including scheduling information of data #n and resource allocation information for transmission or reception of data #m; transmitting SCI #n to a second terminal via PSCCH #n; and transmitting data #n to the second terminal via PSSCH #n indicated by the scheduling information included in SCI #n. Therefore, the performance of a communication system can be improved.

10 Claims, 26 Drawing Sheets

(51) Int. Cl.
*H04W 72/0453* (2023.01)
*H04W 72/1263* (2023.01)

(58) Field of Classification Search
CPC ............. H04L 5/0094; H04L 27/0006; H04W 4/40–48; H04W 4/70; H04W 72/0446; H04W 72/0453; H04W 72/1263; H04W 72/20; H04W 72/25; H04W 72/53; H04W 76/14; H04W 92/18
See application file for complete search history.

(56) References Cited

U.S. PATENT DOCUMENTS

| | | | |
|---|---|---|---|
| 2016/0353478 A1 | 12/2016 | Kim | |
| 2018/0255444 A1 | 9/2018 | Chae et al. | |
| 2019/0053305 A1 | 2/2019 | Saiwai et al. | |
| 2019/0069200 A1 | 2/2019 | Zhang et al. | |
| 2020/0260472 A1* | 8/2020 | Ganesan | H04W 4/46 |
| 2020/0322939 A1* | 10/2020 | Cao | H04W 72/02 |
| 2022/0061041 A1* | 2/2022 | Chen | H04W 72/20 |
| 2022/0140964 A1* | 5/2022 | Chen | H04L 5/0048 370/330 |

OTHER PUBLICATIONS

Extended European Search Report dated Jul. 21, 2023 from the European Patent Office for European patent application No. 20853851.2, 12 pages.
Nokia, 'Discussion of Resource Allocation for Sidelink Mode 2', R1-1905334, 3GPP TSG RAN WG1 Meeting #96bis, Xi'an, China, Apr. 3, 2019.
Kyocera, 'Sidelink Physical Layer Structure', R1-1909015, 3GPP TSG-RAN WG1#98, Prague, Czech Republic, Aug. 15, 2019.
Huawei 1W-, 'Design and contents of PSCCH and PSFCH', R1-1900858, 3GPP TSG RAN WG1 Ad-Hoc Meeting 1901, Taipei, Jan. 11, 2019.
Intel Corporation, 'Sidelink Physical Structure for NR V2X Communication', R1-1907906, 3GPP TSG RAN WG1 Meeting #97, Reno, USA, May 17, 2019.
Nokia 1W-, 'Discussion of physical layer structure for sidelink', R1-1905332, 3GPP TSG RAN WG1 #96, Xi'an, China, Apr. 3, 2019.
NTT Docomo, Inc., 'NR Sidelink Physical Layer Structure', R1-1906205, 3GPP TSG RAN WG1 #97, Reno, USA, May 3, 2019.
R1-1907012, "Discussion on physical layer structure for NR sidelink", 3GPP TSG RAN WG1 #97, Reno, USA, May 13-17, 2019, 25 pages.
R1-1811607, "On 2-stage PSCCH-I design", 3GPP TSG-RAN WG1 Meeting #94bis, Chengdu, China, Oct. 8-12, 2018, Agenda item: 7.2.4.1.5, 5 pages.
R1-1904793, "Discussion on physical layer structure for sidelink", 3GPP TSG RAN WG1 #96bis, Xi'an, China, Apr. 8-12, 2019, Agenda item: 7.2.4.1, 9 pages.
R1-1906074, "Discussion of physical layer structure for sidelink", 3GPP TSG RAN WG1 #97, Reno, USA, May 13-17, 2019, Agenda item: 7.2.4.1, 18 pages.
R1-1908737, "Two-stage SCI design and adaptive DMRS support for sidelink", 3GPP TSG RAN WG1 Meeting #98, Prague, Czech Republic, Aug. 26-30, 2019, Agenda item: 7.2.4.1, 6 pages.

* cited by examiner

METHOD FOR CONFIGURING SIDELINK RESOURCE IN COMMUNICATION SYSTEM

CROSS-REFERENCE TO RELATED APPLICATIONS

This application is a National Phase application filed under 35 USC 371 of PCT International Application No. PCT/KR2020/010016 with an International Filing Date of Jul. 29, 2020, which claims priority from U.S. Provisional Application 62/913,387 filed on Oct. 10, 2019 and U.S. Provisional Application 62/887,904 filed on Aug. 16, 2019. The entire contents of these applications are incorporated herein by reference in their entirety.

BACKGROUND

(a) Technical Field

The present disclosure relates to a sidelink communication technique, more particularly, to a technique for configuring sidelink resources in a communication system.

(b) Description of the Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, a method of configuring sidelink resources is required for transmission of periodic data or aperiodic data. The sidelink resources may be a physical sidelink control channel (PSCCH) and/or a physical sidelink shared channel (PSSCH). A transmission scheme of data (e.g., sidelink data) may be determined according to an operation scheme of a PSCCH and/or PSSCH. Accordingly, methods for configuring a PSCCH and/or PSSCH for efficiently transmitting data in sidelink communication are required.

SUMMARY

An objective of the present disclosure for solving the above-described problem is to provide a method for configuring sidelink resources for data transmission in a communication system.

An operation method of a first terminal, according to a first exemplary embodiment of the present disclosure for achieving the objective, may comprise: generating sidelink control information (SCI) #n including scheduling information of data #n and resource allocation information for transmission and reception of data #m; transmitting the SCI #n to a second terminal on a physical sidelink control channel (PSCCH) #n; and transmitting the data #n to the second terminal on a physical sidelink shared channel (PSSCH) #n indicated by the scheduling information included in the SCI #n.

The operation method may further comprise: generating SCI #m including scheduling information of the data #m; transmitting the SCI #m to the second terminal on a PSCCH #m within a resource region indicated by the resource allocation information; and transmitting the data #m to the second terminal on a PSSCH #m indicated by the scheduling information included in the SCI #m within the resource region indicated by the resource allocation information.

The resource allocation information may indicate the resource region including the PSCCH #m and the PSSCH #m.

The SCI #n may be transmitted on the PSCCH #n belonging to an SCI occasion, and the SCI #n may be mapped to physical resources based on a frequency-first scheme.

The SCI #n may be mapped to physical resources belonging to an SCI occasion according to a mapping pattern, and the mapping pattern is configured by higher layer signaling.

The number of resource elements (REs) to which the SCI #n is mapped may be determined according to the mapping pattern.

An SCI occasion to which the PSCCH #n belongs may be configured for each resource pool, and the SCI occasion may be configured by higher layer signaling.

The size of an SCI occasion to which the PSSCH #n belongs may depend on the size of a resource region including the PSCCH #n and the PSSCH #n.

An operation method of a first terminal, according to a second exemplary embodiment of the present disclosure for achieving the objective, may comprise: generating first-stage sidelink control information (SCI) including scheduling information of data; generating second-stage SCI associated with the first-stage SCI; transmitting the first-stage SCI to a second terminal in a first resource region; and transmitting the second-stage SCI to the second terminal in a second resource region associated with the first resource region.

An association relationship between the first resource region and the second resource region may be configured by higher layer signaling, and a position of the second resource region may be determined according to a position of the first resource region.

The first resource region and the second resource region may belong to an SCI occasion, and the first resource region and the second resource region may be contiguous physical resources within the SCI occasion.

The size of the second resource region may be determined according to a resource allocation format of the second-stage SCI, and the resource allocation format may be indicated by higher layer signaling.

A first reference signal used for demodulation of the first-stage SCI may be transmitted in the first resource region, and a second reference signal used for demodulation of the second-stage SCI may be transmitted in the second resource region.

The first reference signal and the second reference signal may be mapped to same physical resources.

An operation method of a first terminal, according to a third exemplary embodiment of the present disclosure for achieving the objective, may comprise: generating first-stage sidelink control information (SCI) #n including resource allocation information #n for transmission and reception of data #n; generating first-stage SCI #m including resource allocation information #m for transmission and reception of data #m; and transmitting the first-stage SCI #n and the first-stage SCI #m in a first SCI occasion, wherein n and m are natural numbers different from each other.

A position of a second resource region in which the first-stage SCI #m is transmitted may be determined according to a position of a first resource region in which the first-stage SCI #n is transmitted, and a mapping relationship between the first resource region and the second resource region may be configured by higher layer signaling.

A reference signal #n used for demodulation of the first-stage SCI #n and a reference signal #m used for demodulation of the first-stage SCI #m may be transmitted in the first SCI occasion.

The first-stage SCI #n and the first-stage SCI #m may be mapped to same symbols or different symbols in the first SCI occasion.

The first SCI occasion may be independently configured for each resource pool, and configuration information of the first SCI occasion may be indicated by higher layer signaling.

The operation method may further comprise: transmitting second-stage SCI #n to a second terminal in a second SCI occasion #n belonging to a resource region #n indicated by the resource allocation information #n; based on information included in the first-stage SCI #n and the second-stage SCI #n, transmitting the data #n to the second terminal on a physical sidelink shared channel (PSSCH) #n belonging to the resource region #n; transmitting second-stage SCI #m to a third terminal in a second SCI occasion #m belonging to a resource region #m indicated by the resource allocation information #m; and based on information included in the first-stage SCI #m and the second-stage SCI #m, transmitting the data #m to the third terminal on a PSSCH #m belonging to the resource region #m.

According to the present disclosure, sidelink control information (SCI) may include configuration information of a subsequent PSCCH-PSSCH resource region. Accordingly, the terminal can efficiently perform sidelink communication in the PSCCH-PSSCH resource region indicated by the SCI. When a multi-SCI scheme is used, a mapping relationship between a transmission resource region of a first-stage SCI and a transmission resource region of a second-stage SCI may be configured, and the first-stage-SCI and the second-stage SCI may be transmitted in the resource regions according to the mapping relationship. Accordingly, a procedure for transmitting and receiving SCIs can be performed efficiently, and a procedure for transmitting and receiving data scheduled by the SCIs can also be performed efficiently. That is, the performance of the communication system can be improved.

DETAILED DESCRIPTION

Figure 1:
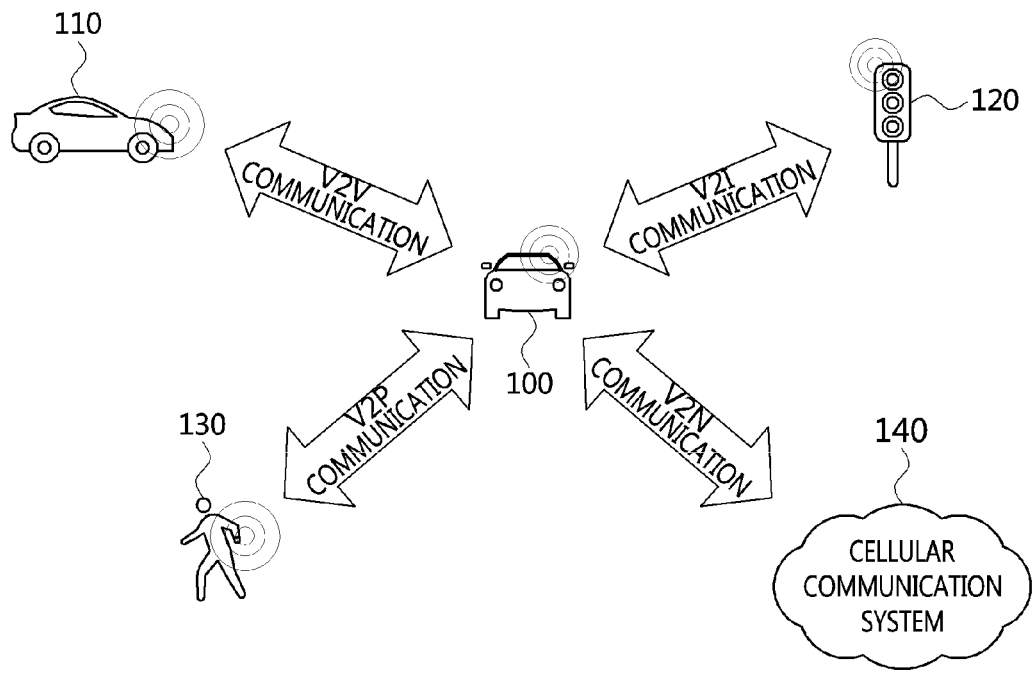
FIG. 1 is a conceptual diagram illustrating V2X communication scenarios.

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present disclosure will be described in detail with reference to the accompanying drawings. In describing the present disclosure, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
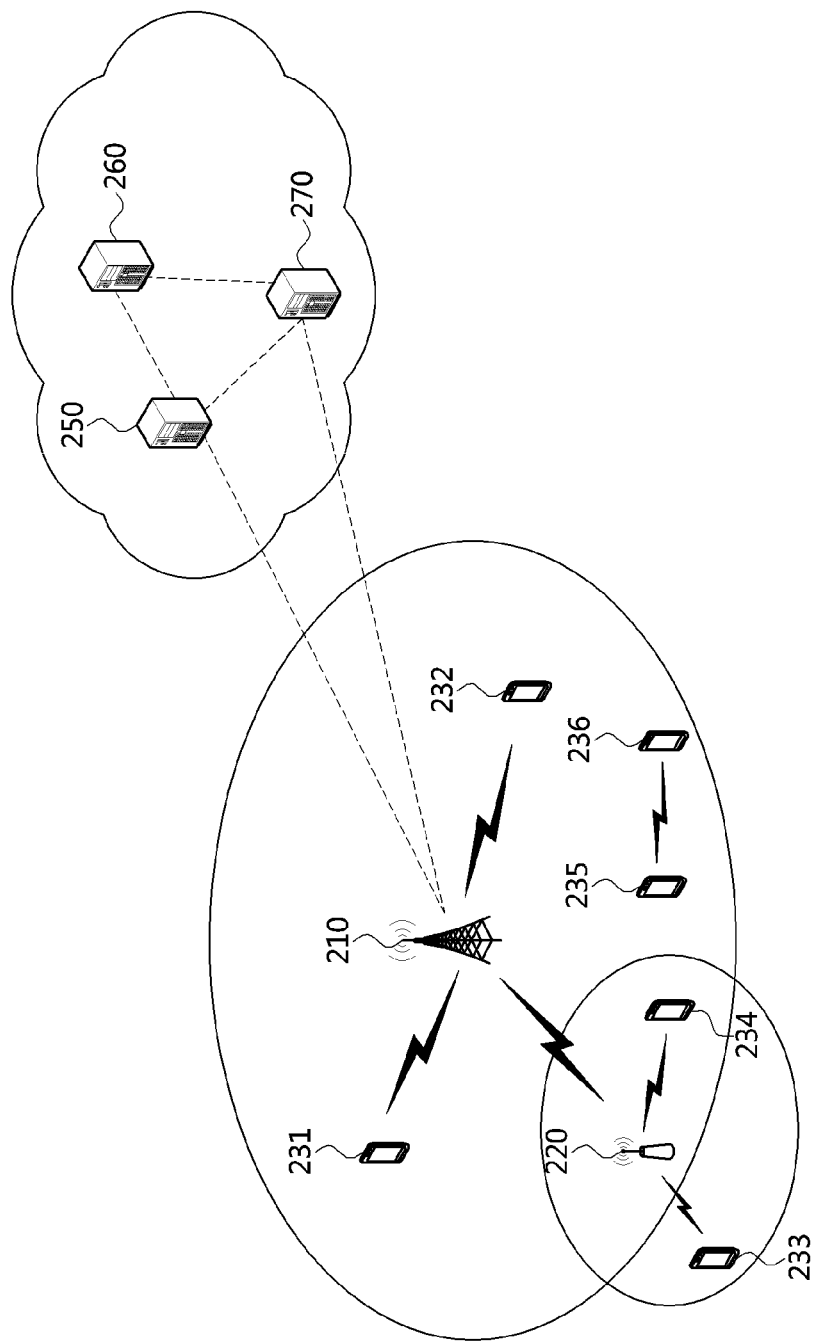
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
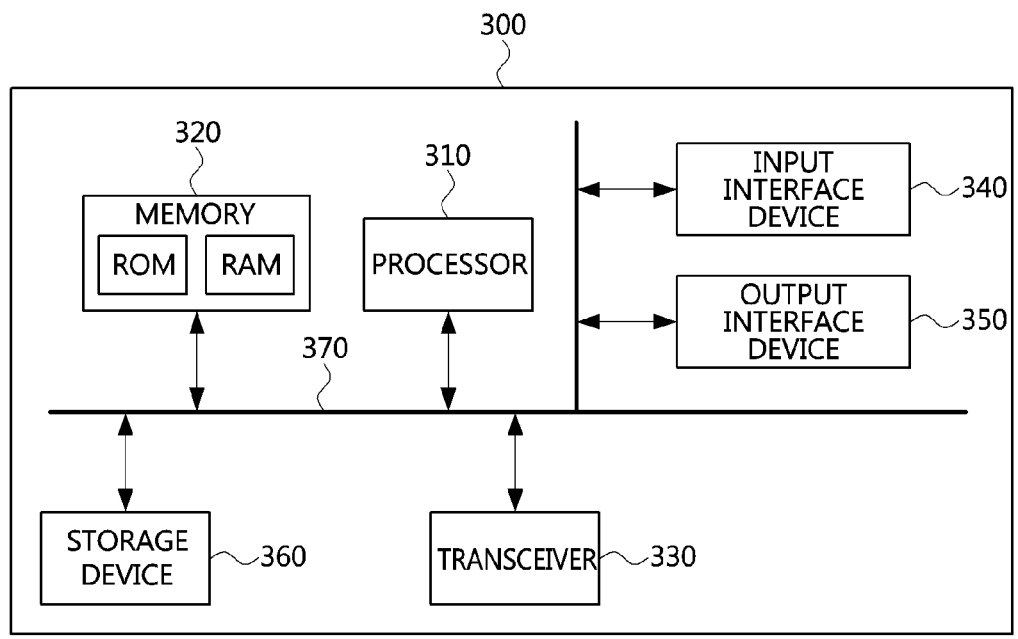
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
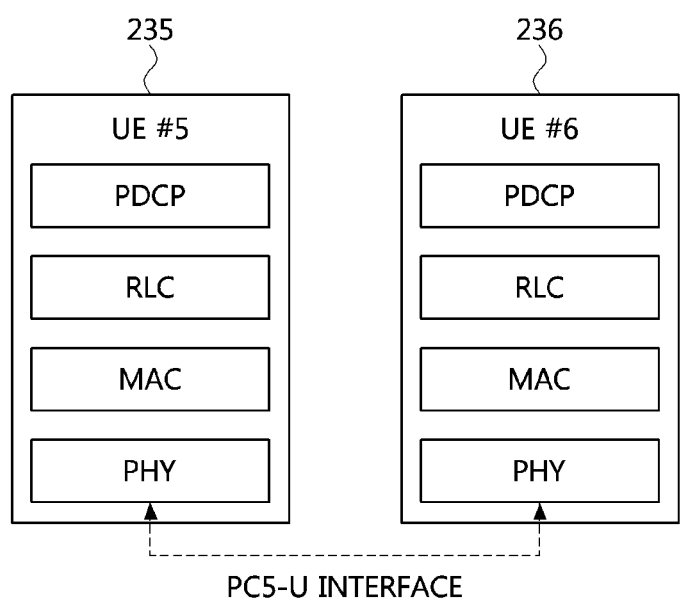
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
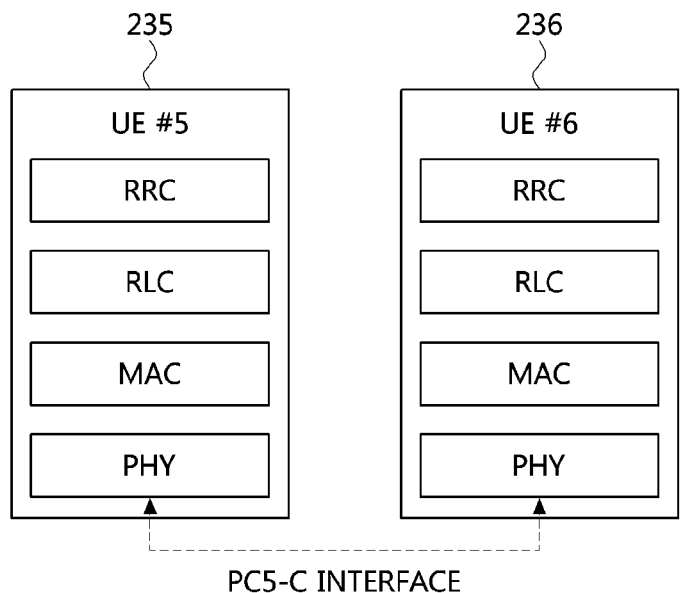
FIG. 5 is a block diagram illustrating a first exemplary embodiment of a control plane protocol stack of a UE performing sidelink communication.
Figure 6:
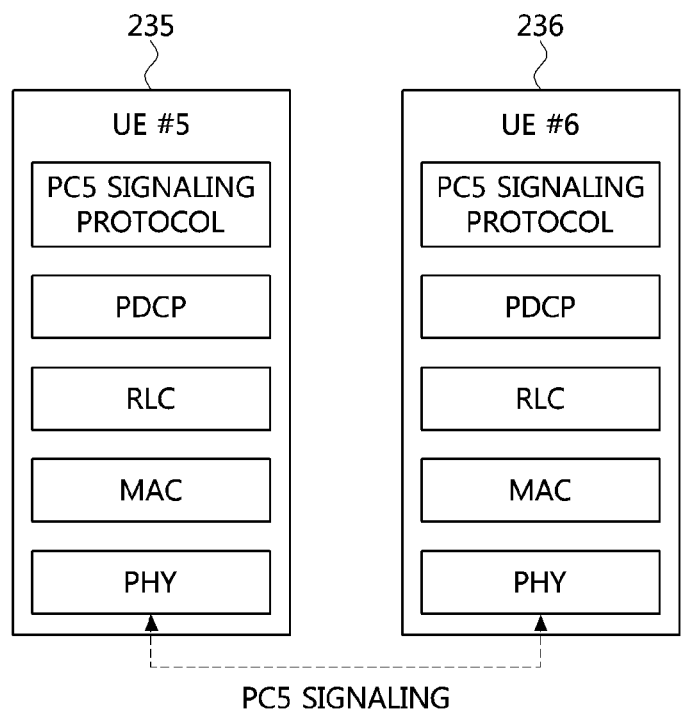
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for configuring sidelink resources will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

In exemplary embodiments, sidelink communication methods between a transmitting terminal and a receiving terminal will be described. The transmitting terminal may refer to a terminal transmitting data (e.g., sidelink data), and the receiving terminal may refer to a terminal receiving the data.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'.

The 1st-stage SCI may include or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

[Single-SCI Scheme]

A PSCCH-PSSCH resource region may be configured in the communication system. The PSCCH-PSSCH resource region may be a resource pool for sidelink communication. The PSCCH-PSSCH resource region may include a PSCCH and a PSSCH. For example, the PSCCH-PSSCH resource region may be one resource set including a PSCCH and a PSSCH. SCI may be transmitted on the PSCCH, and data may be transmitted on the PSSCH. In addition, 2nd-stage SCI may be transmitted on the PSSCH. The PSCCH-PSSCH resource region may be configured as follows.

Figure 7:
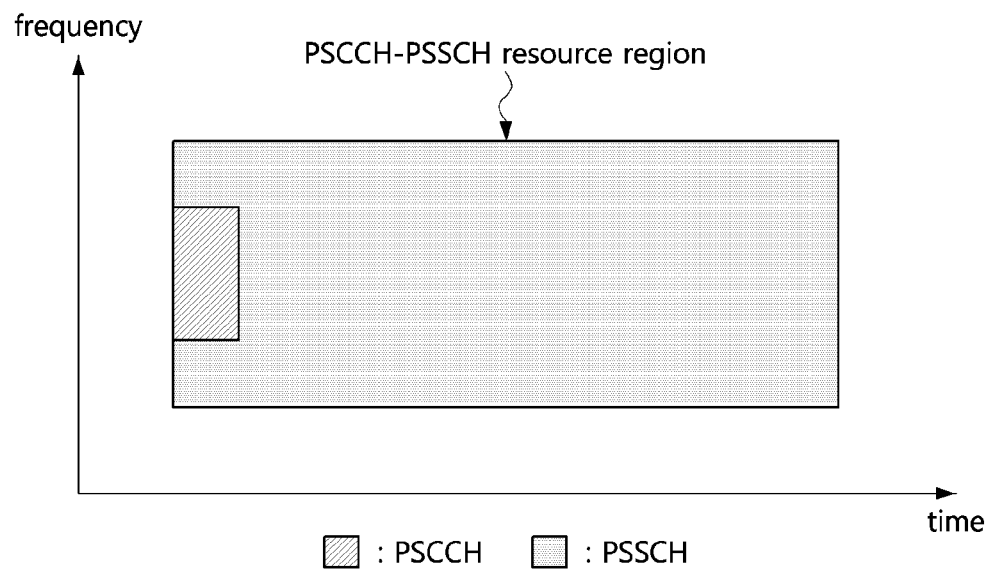
FIG. 7 is a conceptual diagram illustrating a first exemplary embodiment of a PSCCH-PSSCH resource region in a communication system supporting sidelink communication.

FIG. 7 is a conceptual diagram illustrating a first exemplary embodiment of a PSCCH-PSSCH resource region in a communication system supporting sidelink communication.

As shown in FIG. 7, a size of a PSCCH frequency resource may be set to be less than or equal to a size of a frequency resource of a PSCCH-PSSCH resource region (e.g., PSSCH). A PSCCH may be located from the first resource (e.g., symbol, slot) of the PSCCH-PSSCH resource region in the time domain. The PSCCH and a PSSCH may be located in one or more symbols. For example, the PSCCH may be multiplexed with the PSSCH in the frequency domain. Each of the PSCCH and PSSCH may be distinguished in the time-frequency domain.

Configuration information of the PSCCH-PSSCH resource region may be transmitted through one or a combination of two or more of higher layer signaling, MAC signaling, and PHY signaling. In the PSCCH-PSSCH resource region, a first resource region may be configured as the PSCCH, and a second resource region may be configured as the PSSCH. The first resource region may be orthogonal to the second resource region. The terminal may obtain SCI by performing a blind decoding operation on the PSCCH (e.g., first resource region), and may receive data on the PSSCH (e.g., second resource region) indicated by the SCI.

Figure 8:
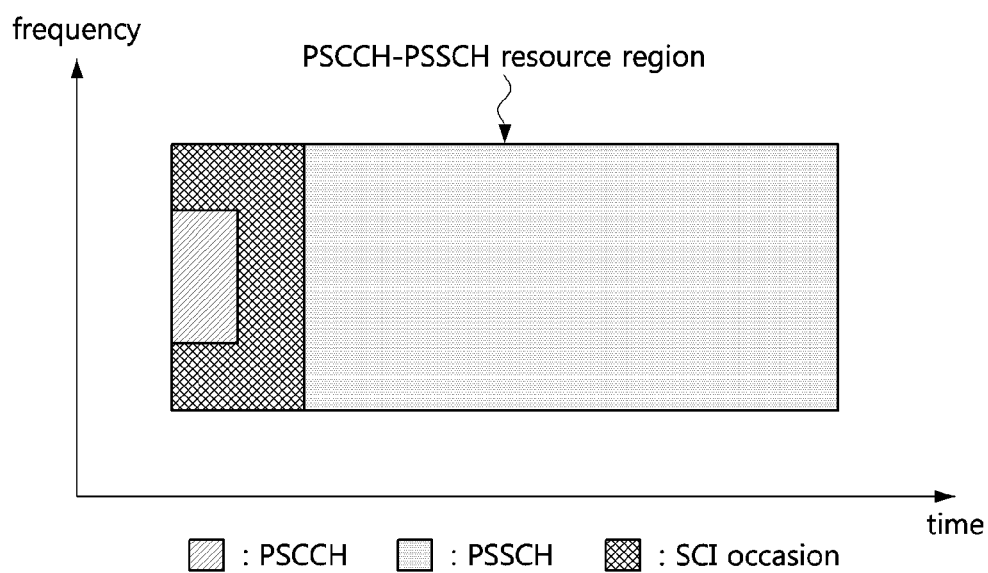
FIG. 8 is a conceptual diagram illustrating a second exemplary embodiment of a PSCCH-PSSCH resource region in a communication system supporting sidelink communication.

FIG. 8 is a conceptual diagram illustrating a second exemplary embodiment of a PSCCH-PSSCH resource region in a communication system supporting sidelink communication.

As shown in FIG. 8, a PSCCH-PSSCH resource region may include an SCI occasion and a PSSCH, and a PSCCH may be configured within the SCI occasion. The SCI occasion may be a resource region in which SCI may be transmitted. For example, the SCI may be transmitted in the SCI occasion (e.g., a partial resource region or an entire resource region of the SCI occasion). Alternatively, the SCI may not be transmitted in the SCI occasion. The SCI occasion may be referred to as a 'PSCCH occasion' or a 'PSCCH transmission occasion'.

The SCI occasion may be configured periodically or aperiodically. The base station may transmit a higher layer signaling message including configuration information of one or more SCI occasions. The terminal(s) may receive the higher layer signaling message from the base station, and may identify the configuration information of the one or more SCI occasions included in the higher layer signaling message. A transmitting terminal may transmit information indicating activation or deactivation of an SCI occasion to a receiving terminal through MAC signaling and/or PHY signaling. The receiving terminal may identify an active SCI occasion and/or an inactive SCI occasion based on the information received from the transmitting terminal.

The transmitting terminal may transmit SCI in the SCI occasion (e.g., active SCI occasion), and the receiving terminal may perform a monitoring operation on the SCI occasion (e.g., active SCI occasion) to receive the SCI. The receiving terminal may not expect to receive the SCI from the transmitting terminal in the inactive SCI occasion. That is, the receiving terminal may not perform a monitoring operation on the inactive SCI occasion. The above-described operations may be applied to the single-SCI scheme and/or the multi-SCI scheme. When the above-described operations are applied to the multi-SCI scheme, the transmitting terminal may activate or deactivate each of a first SCI occasion and a second SCI occasion.

A size of a frequency resource of the SCI occasion may be set to be less than or equal to the size of the frequency resource of the PSCCH-PSSCH resource region (e.g., PSSCH). The SCI occasion may be located in the front region within the PSCCH-PSSCH resource region in the time domain. For example, the SCI occasion may be located from the first resource (e.g., symbol, slot) within the PSCCH-PSSCH resource region in the time domain. The SCI occasion may include one or more symbols in the time domain. The SCI occasion may be arranged in various positions within the PSCCH-PSSCH resource region as well as the above-described position.

When the single-SCI scheme is used, SCI (e.g., 1st-stage SCI) may be transmitted on a PSCCH within the SCI occasion. When the multi-SCI scheme is used, 1st-stage SCI may be transmitted on the PSCCH within the SCI occasion, and 2nd-stage SCI may be transmitted on a PSSCH within the SCI occasion. Alternatively, the first SCI occasion for the 1st-stage SCI and the second SCI occasion for the 2nd-stage SCI may be configured, the 1st-stage SCI may be transmitted on a PSCCH within the first SCI occasion, and the 2nd-stage SCI may be transmitted on a PSSCH within the second SCI occasion. In the time-frequency domain, the first SCI occasion may be orthogonal to the second SCI occasion. Alternatively, the second SCI occasion may include a partial resource region or the entire resource region of the first SCI occasion. In the time-frequency domain, the first SCI occasion may overlap the second SCI occasion. In exemplary embodiments, the SCI occasion may be used as meaning including the first SCI occasion and/or the second SCI occasion.

Meanwhile, when the PSCCH-PSSCH resource region is configured (e.g., allocated) as one resource set, the PSCCH-PSSCH resource region may be represented as a combination of a time resource and a frequency resource. The time resource of the PSCCH-PSSCH resource region may be represented by a symbol index, number of symbols, slot index, number of slots, resource element (RE) index, or number of REs. The frequency resource of the PSCCH-PSSCH resource region may be represented by a subcarrier index, number of subcarriers, physical resource block (PRB) index, number of PRBs, resource block (RB) set index, number of RB sets, subchannel index, number of subchannels, RE index, or number of REs. The PSCCH-PSSCH resource region shown in FIG. 7 or FIG. 8 may be indicated by a combination of the above-described parameters.

For example, in the time domain, the PSCCH-PSSCH resource region may be indicated by a start symbol index and an end symbol index. Alternatively, in the time domain, the PSCCH-PSSCH resource region may be indicated by a start symbol index and a duration. The duration may indicate the entire time resource (e.g., the total number of symbols) of the PSCCH-PSSCH resource region. In another exemplary embodiment, in the time domain, the PSCCH-PSSCH resource region may be indicated by a start slot index and an end slot index. Alternatively, in the time domain, the PSCCH-PSSCH resource region may be indicated by a start slot index and an duration. The duration may indicate the entire time resource (e.g., the total number of slots) of the PSCCH-PSSCH resource region.

For example, in the frequency domain, the PSCCH-PSSCH resource region may be indicated by a start subcarrier index and an end subcarrier index. Alternatively, in the frequency domain, the PSCCH-PSSCH resource region may be indicated by a start subcarrier index and the total number of subcarriers. The start subcarrier index may indicate a subcarrier having the lowest frequency in the PSCCH-PSSCH resource region, and the end subcarrier index may indicate a subcarrier having the highest frequency in the PSCCH-PSSCH resource region. Alternatively, the start subcarrier index may indicate the subcarrier having the highest frequency in the PSCCH-PSSCH resource region, and the end subcarrier index may indicate the subcarrier having the lowest frequency in the PSCCH-PSSCH resource region.

In another exemplary embodiment, in the frequency domain, the PSCCH-PSSCH resource region may be indicated by a start RB index and an end RB index. Alternatively, in the frequency domain, the PSCCH-PSSCH resource region may be indicated by a start RB index and the total number of RBs. The start RB index may indicate an RB having the lowest frequency in the PSCCH-PSSCH resource region, and the end RB index may indicate an RB having the highest frequency in the PSCCH-PSSCH resource region. Alternatively, the start RB index may indicate the RB having the highest frequency in the PSCCH-PSSCH resource region, and the end RB index may indicate the RB having the lowest frequency in the PSCCH-PSSCH resource region. Here, the RB may be a common RB (CRB) or a PRB.

On the other hand, the SCI may be mapped to resources (e.g., REs) based on a 'frequency-first scheme' or a 'time-first scheme'. When the frequency-first scheme is used, the SCI may be first mapped to frequency resources (e.g., subcarriers) of a symbol #k. When frequency resources to which the SCI is to be mapped do not exist in the symbol #k (e.g., when SCI mapping is completed in the frequency resources of the symbol #k), the SCI may be mapped to frequency resources of a symbol #(k+1). Here, k may be a natural number. When the time-first scheme is used, the SCI may be first mapped to time resources (e.g., symbols) of a subcarrier #p. When time resources to which the SCI is to be mapped do not exist in the subcarrier #p (e.g., when SCI mapping is completed in the time resources of the subcarrier #p), the SCI may be mapped to time resource of a subcarrier #(p−1) or subcarrier #(p+1). Here, p may be a natural number. In order to reduce the complexity of blind decoding operation and to obtain the SCI quickly, the SCI may be mapped based on the frequency-first scheme.

Figure 9A:
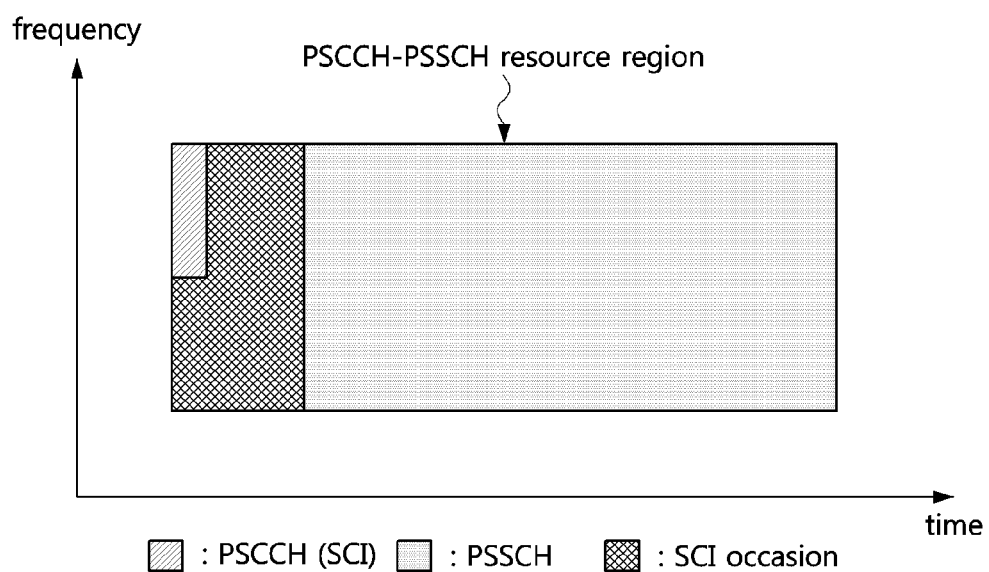
FIG. 9A is a conceptual diagram illustrating a first exemplary embodiment of a resource region to which SCI is mapped in a communication system supporting sidelink communication.
Figure 9B:
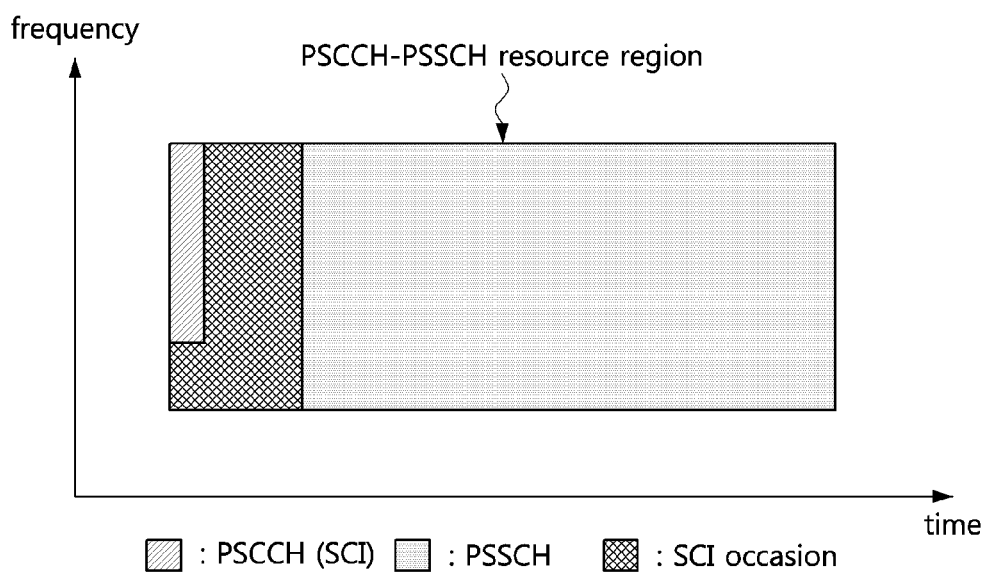
FIG. 9B is a conceptual diagram illustrating a second exemplary embodiment of a resource region to which SCI is mapped in a communication system supporting sidelink communication.
Figure 9C:
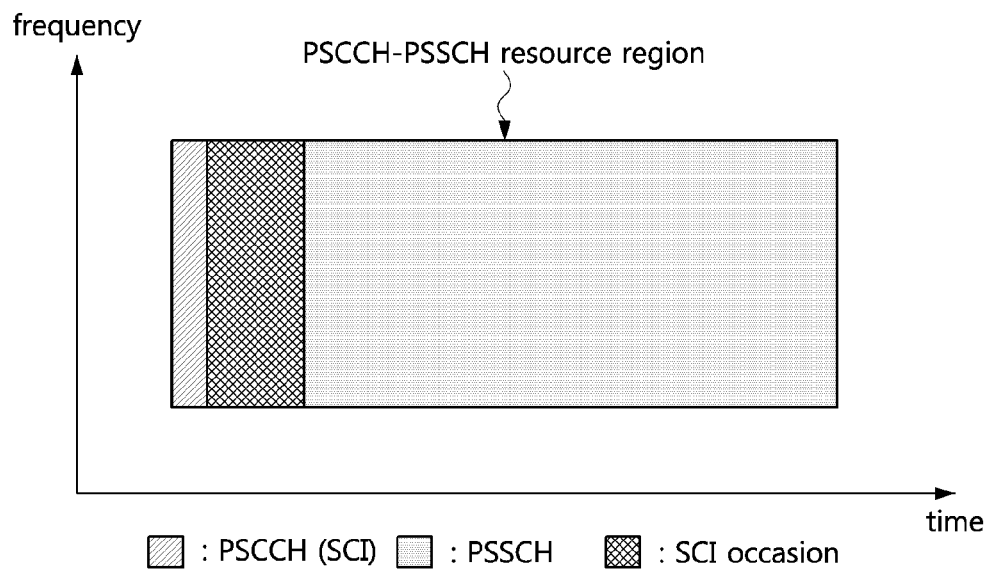
FIG. 9C is a conceptual diagram illustrating a third exemplary embodiment of a resource region to which SCI is mapped in a communication system supporting sidelink communication.
Figure 9D:
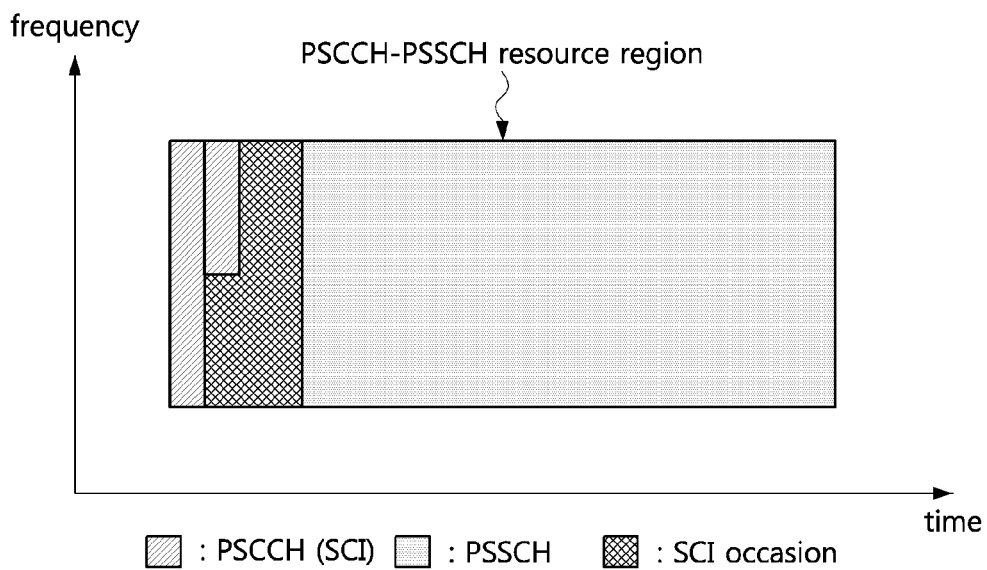
FIG. 9D is a conceptual diagram illustrating a fourth exemplary embodiment of a resource region to which SCI is mapped in a communication system supporting sidelink communication.

FIG. 9A is a conceptual diagram illustrating a first exemplary embodiment of a resource region to which SCI is mapped in a communication system supporting sidelink communication, FIG. 9B is a conceptual diagram illustrating a second exemplary embodiment of a resource region to which SCI is mapped in a communication system supporting sidelink communication, FIG. 9C is a conceptual diagram illustrating a third exemplary embodiment of a resource region to which SCI is mapped in a communication system supporting sidelink communication, and FIG. 9D is a conceptual diagram illustrating a fourth exemplary embodiment of a resource region to which SCI is mapped in a communication system supporting sidelink communication.

As shown in FIGS. 9A to 9D, a PSCCH-PSSCH resource region may include an SCI occasion and a PSSCH. SCI may be mapped to resources within the SCI occasion, and the resources to which the SCI is mapped may be a PSCCH. The SCI may be mapped from a start subcarrier in the first symbol within the PSCCH-PSSCH resource region. The starting subcarrier may be a subcarrier having the highest frequency among subcarriers constituting the PSCCH-PSSCH resource region. When mapping of SCI is completed in subcarriers of the first symbol within the PSCCH-PSSCH resource region, the SCI may be mapped from a start subcarrier in the second symbol within the PSCCH-PSSCH resource region.

In another exemplary embodiment, the start subcarrier may be a subcarrier having the lowest frequency or an arbitrary frequency among the subcarriers constituting the PSCCH-PSSCH resource region. Alternatively, the SCI may be mapped to resources according to a scheme (e.g., time-first scheme or a scheme according to another priority) other than the frequency-first scheme.

A pattern of the resources to which the SCI is mapped may vary according to the size or format of the SCI. For example, the exemplary embodiment shown in FIG. 9A may be an SCI mapping pattern #1, the exemplary embodiment shown in FIG. 9B may be an SCI mapping pattern #2, the exemplary embodiment shown in FIG. 9C may be an SCI mapping pattern #3, and the exemplary embodiment shown in FIG. 9D may be an SCI mapping pattern #4. The SCI mapping pattern may be indicated by one or a combination of two or more of higher layer signaling, MAC signaling, and PHY signaling.

The transmitting terminal may map the SCI according to the SCI mapping pattern indicated by signaling. For example, the transmitting terminal may transmit the SCI to the receiving terminal by using one SCI mapping pattern among the four SCI mapping patterns. The receiving terminal may identify the start resource (e.g., the start subcarrier of the first symbol within the PSCCH-PSSCH resource region) to which the SCI is mapped, and may obtain the SCI by performing blind decoding operations (e.g., four blind decoding operations) on the resources according to the SCI mapping patterns #1 to #4 indicated by signaling.

In addition to a reference of the size of the resource required for transmission of the SCI (e.g., PSCCH), a specific SCI mapping pattern may be configured as in the exemplary embodiments shown in FIGS. 9A to 9D. A resource region of the PSCCH may be allocated (e.g., configured) according to the SCI mapping pattern. The SCI mapping pattern may be configured according to a format, size, and/or MCS level of the SCI. The number (e.g., maximum number) of SCI mapping patterns may be preset. When each of the SCI format, SCI size, and MCS level is fixed to one value, one SCI mapping pattern may be used. In this case, the receiving terminal may obtain the SCI without performing a blind decoding operation.

In the exemplary embodiments shown in FIGS. 9A to 9D, the SCI occasion may not be configured. Even in this case, the SCI may be transmitted in resources according to the SCI mapping pattern, and the receiving terminal may obtain the SCI by performing a blind decoding operation on the resources according to the SCI mapping pattern. The size of the frequency resource of each of the PSCCH and the PSSCH may not be fixed. In this case, PSCCH resource allocation may be changed according to the size of the frequency resource configured for sidelink communication.

Figure 10A:
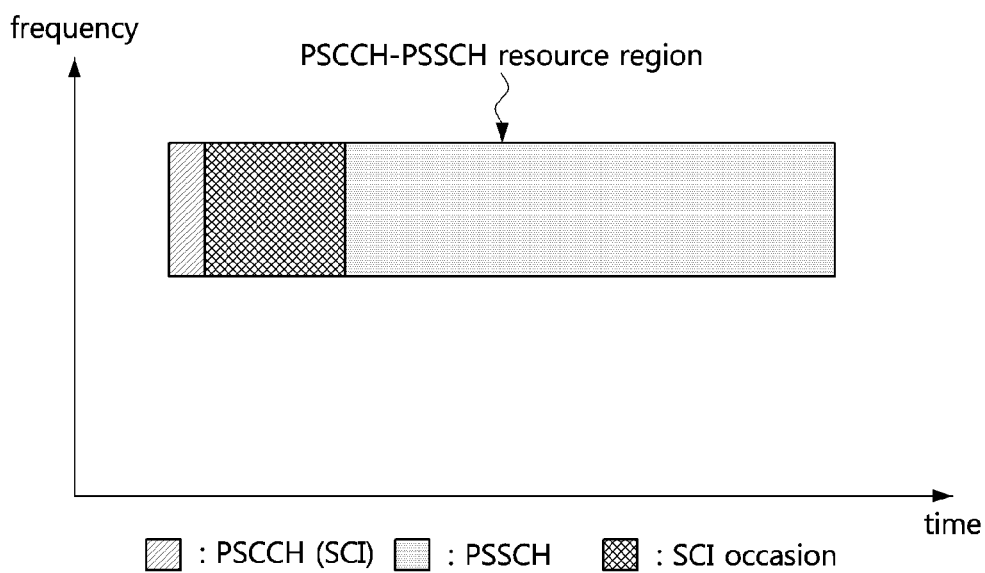
FIG. 10A is a conceptual diagram illustrating a fifth exemplary embodiment of a resource region to which SCI is mapped in a communication system supporting sidelink communication
Figure 10B:
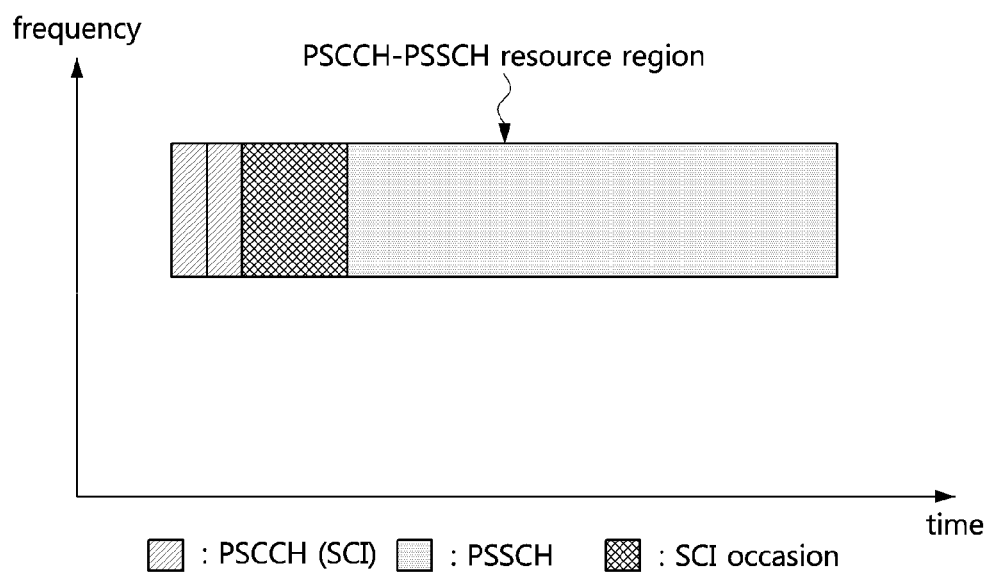
FIG. 10B is a conceptual diagram illustrating a sixth exemplary embodiment of a resource region to which SCI is mapped in a communication system supporting sidelink communication
Figure 10C:
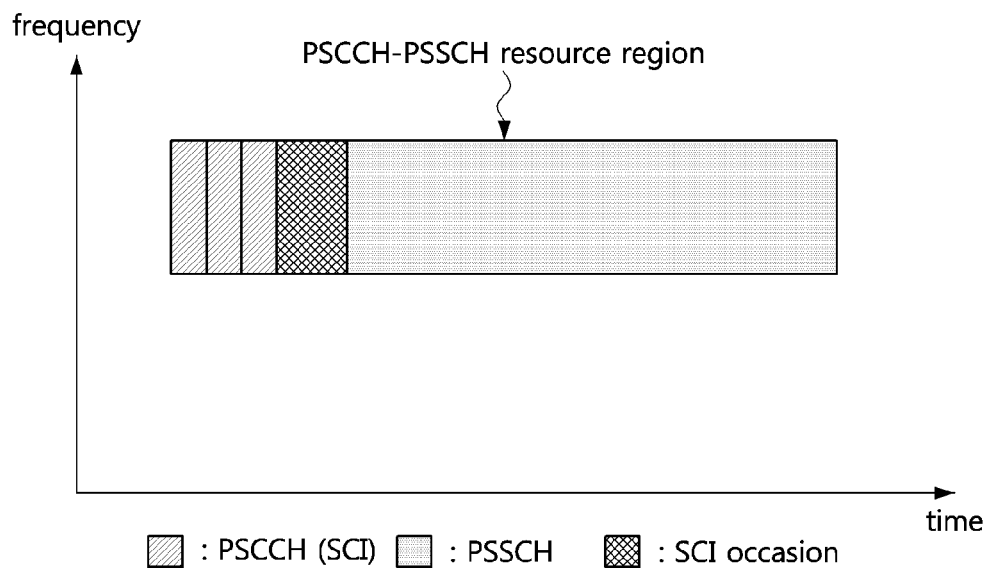
FIG. 10C is a conceptual diagram illustrating a seventh exemplary embodiment of a resource region to which SCI is mapped in a communication system supporting sidelink communication
Figure 10D:
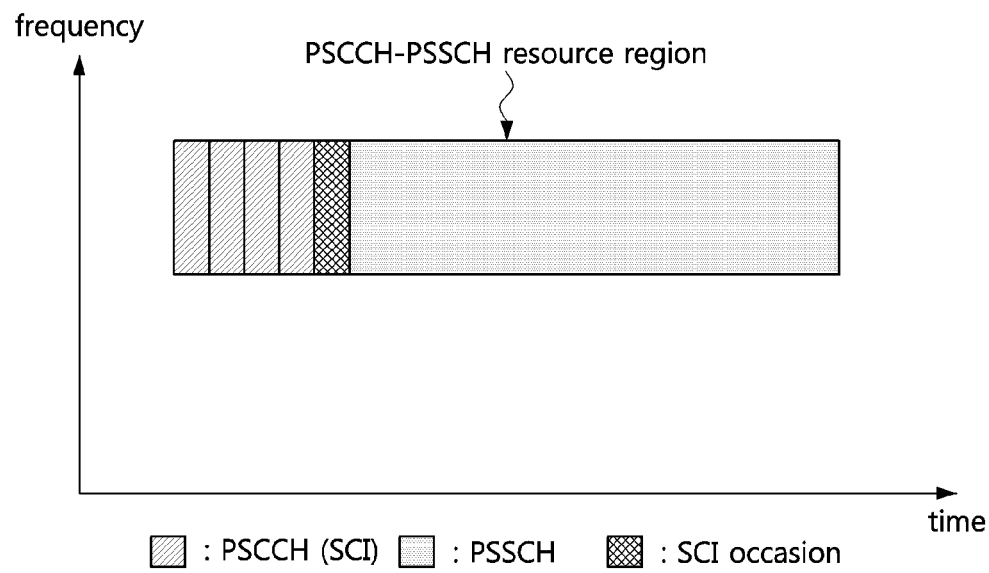
FIG. 10D is a conceptual diagram illustrating an eighth exemplary embodiment of a resource region to which SCI is mapped in a communication system supporting sidelink communication.

FIG. 10A is a conceptual diagram illustrating a fifth exemplary embodiment of a resource region to which SCI is mapped in a communication system supporting sidelink communication, FIG. 10B is a conceptual diagram illustrating a sixth exemplary embodiment of a resource region to which SCI is mapped in a communication system supporting sidelink communication, FIG. 10C is a conceptual diagram illustrating a seventh exemplary embodiment of a resource region to which SCI is mapped in a communication system supporting sidelink communication, and FIG. 10D is a conceptual diagram illustrating an eighth exemplary embodiment of a resource region to which SCI is mapped in a communication system supporting sidelink communication.

As shown in FIGS. 10A to 10D, a PSCCH-PSSCH resource region may include an SCI occasion and a PSSCH. The SCI may be mapped to resources within the SCI occasion, and the resources to which the SCI is mapped may be a PSCCH. The size of the frequency resource of the PSCCH-PSSCH resource region in the exemplary embodiments shown in FIGS. 10A to 10D may be smaller than the size of the frequency resource of the PSCCH-PSSCH resource region in the exemplary embodiments shown in FIGS. 9A to 9D.

The exemplary embodiment shown in FIG. 10A may be an SCI mapping pattern #5, the exemplary embodiment shown in FIG. 10B may be an SCI mapping pattern #6, the exemplary embodiment shown in FIG. 10C may be an SCI mapping pattern #7, and the exemplary embodiment shown in FIG. 10D may be an SCI mapping pattern #8. The SCI mapping pattern may be indicated by one or a combination of two or more of higher layer signaling, MAC signaling, and PHY signaling. In each of the SCI mapping patterns #5 to #8, the number of symbols to which the SCI is mapped may be different, and the SCI may be mapped to all frequency resources of one symbol in each of the SCI mapping patterns #5 to #8. On the other hand, in each of the SCI mapping patterns #1 and #2, the SCI may be mapped to some frequency resources of one symbol.

In the communication system, y SCI mapping patterns may be used, and y may be indicated by one or a combination of two or more of higher layer signaling, MAC signaling, and PHY signaling. Here, y may be a natural number. The size of frequency resources for sidelink communication may be preset, and SCI mapping patterns according to the size of frequency resources for sidelink communication may be configured as shown in Table 3 below. Here, the frequency resources for sidelink communication may be 'frequency resources of a SL resource pool', 'frequency resources of a SL bandwidth part (BWP)', or 'frequency resources of a PSCCH-PSSCH resource region'.

TABLE 3

| Size of frequency resources for sidelink communication | SCI mapping pattern |
| --- | --- |
| 2 PRBs | SCI mapping pattern #4 |
| 4 PRBs | SCI mapping pattern #3 |
| 6 PRBs | SCI mapping pattern #2 |
| 8 PRBs | SCI mapping pattern #1 |

The SCI mapping patterns #1 to #4 in Table 3 may be the exemplary embodiments shown in FIGS. 9A to 9D. Alternatively, the SCI mapping patterns #1 to #4 in Table 3 may be the exemplary embodiments shown in FIGS. 10A to 10D. In this case, the SCI mapping pattern #1 of Table 3 may be the exemplary embodiment shown in FIG. 10A, the SCI mapping pattern #2 of Table 3 may be the exemplary embodiment shown in FIG. 10B, the SCI mapping pattern #3 of Table 3 may be the exemplary embodiment shown in FIG. 10C, and the SCI mapping pattern #4 of Table 3 may be the exemplary embodiment shown in FIG. 10D. Configuration information of Table 3 (e.g., mapping relationship between the sizes of the frequency resources for sidelink communication and the SCI mapping patterns) may be transmitted through one or a combination of two or more of higher layer signaling, MAC signaling, and PHY signaling.

In Table 3, the frequency resources for sidelink communication may be configured in units of subcarriers, subchannels, or RB sets. Configuration information of each SCI mapping pattern may be associated with Table 3. Resources to which the SCI is mapped according to each SCI mapping pattern may be indicated by one or a combination of two or more of a symbol index, number of symbols, slot index, number of slots, RE index, number of REs, subcarrier index, number of subcarriers, PRB index, number of PRBs, RB set index, number of RB sets, subchannel index, and number of subchannels.

Meanwhile, the number of REs used for SCI transmission may be set for each SCI mapping pattern. For example, the number of REs used for SCI transmission may be configured as shown in Table 4 below.

TABLE 4

| SCI mapping pattern | Number of REs used for SCI transmission |
| --- | --- |
| SCI mapping pattern #1 | 8 REs |
| SCI mapping pattern #2 | 16 REs |
| SCI mapping pattern #3 | 24 REs |
| SCI mapping pattern #4 | 32 REs |

The SCI mapping patterns #1 to #4 in Table 4 may be the exemplary embodiments shown in FIGS. 9A to 9D. Alternatively, the SCI mapping patterns #1 to #4 in Table 4 may be the exemplary embodiments shown in FIGS. 10A to 10D. In this case, the SCI mapping pattern #1 of Table 4 may be the exemplary embodiment shown in FIG. 10A, the SCI mapping pattern #2 of Table 4 may be the exemplary embodiment shown in FIG. 10B, the SCI mapping pattern #3 of Table 4 may be the exemplary embodiment shown in FIG. 10C, and the SCI mapping pattern #4 of Table 4 may be the exemplary embodiment shown in FIG. 10D. Configuration information of Table 4 (e.g., mapping relationship between the SCI mapping patterns and the numbers of REs used for SCI transmission) may be transmitted through one or a combination of two or more of higher layer signaling, MAC signaling, and PHY signaling. When the SCI mapping pattern used for sidelink communication is determined, the SCI may be mapped to REs according to the corresponding SCI mapping pattern among resources configured for sidelink communication. In this case, the SCI mapping pattern may be used regardless of the size of frequency resources for sidelink communication.

In Table 4, the SCI mapping pattern may be used to indicate the number of REs used for SCI transmission. The number of REs used for SCI transmission may be indicated by parameter(s) other than the SCI mapping pattern. The minimum unit of resources used for SCI transmission may be configured as x REs, and (x×i) REs may be used for SCI transmission according to the size of format of the SCI. Alternatively, minimum resources used for SCI transmission may be configured as x REs, and maximum resources used for SCI transmission may be configured as y REs. In this case, the SCI may be transmitted using x or more and y or less REs. Here, each of x, y, and i may be a natural number. Each of x, y, and i may be indicated through one or a combination of two or more of higher layer signaling, MAC signaling, and PHY signaling. Each of x and y may be a natural number.

Meanwhile, configuration information of the PSCCH-PSSCH resource region may be indicated by SCI associated with a PSSCH prior to the corresponding PSCCH-PSSCH resource region. The SCI associated with the PSSCH may be an SCI for scheduling data transmitted on the PSSCH. A short-term reservation message for resource reservation may be defined. In this case, a short-term reservation message including configuration information of the PSCCH-PSSCH resource region may be transmitted to the terminal(s).

Figure 11:
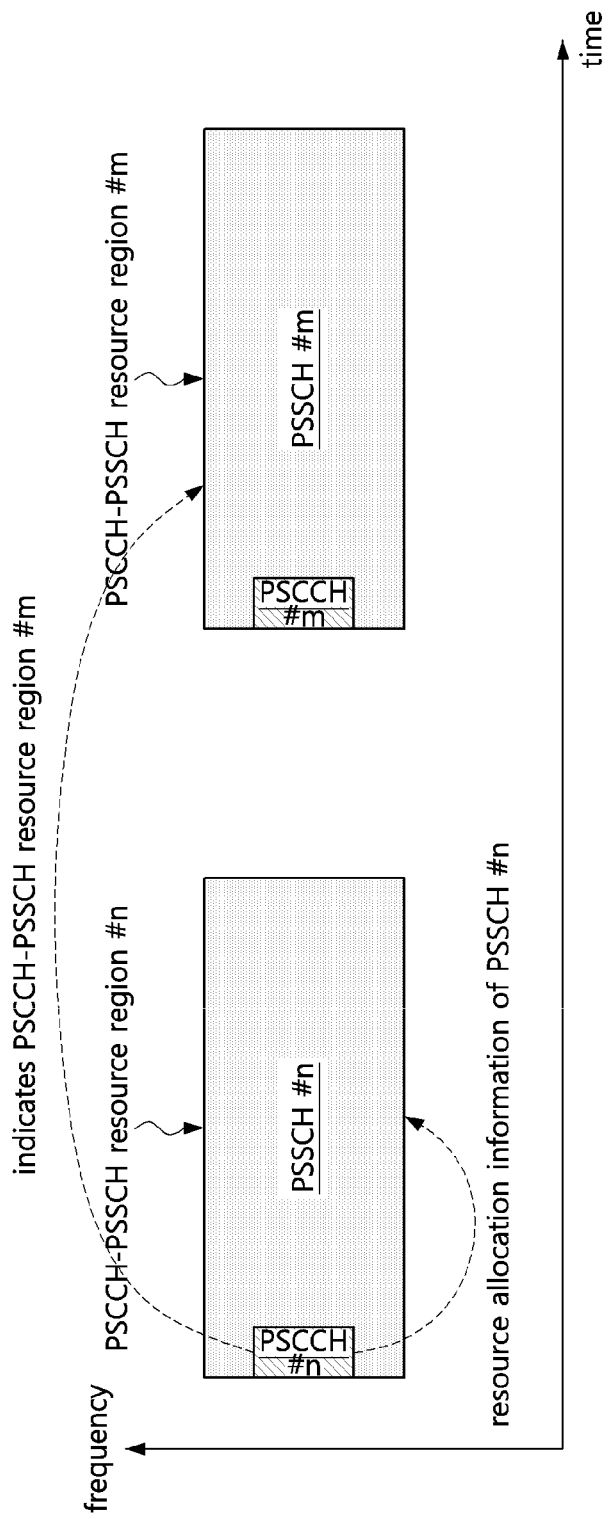
FIG. 11 is a conceptual diagram illustrating a first exemplary embodiment of a method of indicating a PSCCH-PSSCH resource region in a communication system supporting sidelink communication.

FIG. 11 is a conceptual diagram illustrating a first exemplary embodiment of a method of indicating a PSCCH-PSSCH resource region in a communication system supporting sidelink communication.

As shown in FIG. 11, a transmitting terminal may transmit SCI including scheduling information (e.g., resource allocation information) of a PSSCH #n (e.g., data transmitted on the PSSCH #n) on a PSCCH #n. In addition, the SCI transmitted on the PSCCH #n may further include configuration information of a PSCCH-PSSCH resource region #m including a PSCCH #m and a PSSCH #m. Alternatively, the configuration information of the PSCCH-PSSCH resource region #m may be included in another L1 signaling message (e.g., short-term reservation message) instead of the SCI. The PSSCH #n may belong to an SCI occasion, and the SCI occasion may be configured within the PSCCH-PSSCH resource region #n. The SCI occasion may be indicated by one or a combination of two or more of higher layer signaling, MAC signaling, and PHY signaling.

When the PSCCH #m does not need to be indicated (e.g., when configuration information of the PSCCH #m does not need to be transmitted), the SCI or short-term reservation message transmitted on the PSCCH #n may include configuration information of the PSSCH #m instead of the PSCCH-PSSCH resource region #m. When the configuration of the PSCCH #m (e.g., SCI occasion) is associated with the configuration of the PSSCH #m, the SCI transmitted on the PSCCH #n may include configuration information of an SCI occasion belonging to the PSCCH-PSSCH resource region #m. Here, n may be a natural number, and m may be a natural number greater than n.

The receiving terminal may obtain the SCI by performing a monitoring operation (e.g., blind decoding operation) on the PSCCH #n, and may identify information included in the SCI (e.g., scheduling information of the PSSCH #n, configuration information of the PSCCH-PSSCH resource region #m). The receiving terminal may receive data from the transmitting terminal on the PSSCH #n indicated by the SCI. The receiving terminal may perform sidelink communication with the transmitting terminal or another terminal in the PSCCH-PSSCH resource region #m indicated by the SCI.

Meanwhile, the SCI occasion may be configured for each resource pool (e.g., sidelink resource pool). The SCI occasion may be configured within a resource pool (e.g., sidelink resources, PSCCH-PSSCH resource region). The SCI occasion for each resource pool may be configured as shown in Table 5 below.

TABLE 5

| Resource pool | Resource region of SCI occasion |
| --- | --- |
| Resource pool #1 | Time resource: first symbol<br>Frequency resource: frequency resource region #0 |

TABLE 5-continued

| Resource pool | Resource region of SCI occasion |
|---|---|
| Resource pool #2 | Time resource: first symbol |
| | Frequency resource: frequency resource region #1 |
| Resource pool #3 | Time resource: first symbol |
| | Frequency resource: frequency resource region #2 |
| Resource pool #4 | Time resource: first symbol or second symbol |
| | Frequency resource: frequency resource region #0 |

The resource pools #1 to #4 may be resource pools mapped to specific resource regions. The first symbol and/or the second symbol may indicate time resources of the SCI occasion. The first symbol may be a first symbol within a resource pool or a PSCCH-PSSCH resource region belonging to a resource pool in the time domain. The second symbol may be a second symbol within a resource pool or a PSCCH-PSSCH resource region belonging to a resource pool in the time domain. Each of the frequency resource regions #0 to #2 may indicate frequency resources (e.g., all frequency resources) of the SCI occasion. Alternatively, the frequency resources of the SCI occasion may include each of the frequency resource regions #0 to #2. The frequency resource region may be configured in units of PRBs or RBs.

The SCI occasion may be configured as a fixed resource region. For example, the frequency resources of the SCI occasion may be configured with all frequency resources configured for sidelink communication (e.g., all frequency resources of the PSCCH-PSSCH resource region), and the time resources of the SCI occasion may be configured as x symbols from the first symbol among time resources configured for sidelink communication (e.g., all time resources of the PSCCH-PSSCH resource region). Here, x may be a natural number.

The SCI occasion may be configured in a cell-specific manner. In this case, configuration information of the SCI occasion may be transmitted through a higher layer signaling message (e.g., system information and/or RRC message). The SCI occasion configured by higher layer signaling may be changed by another higher layer signaling message, MAC signaling message, and/or PHY signaling message.

The SCI occasion may be configured in a UE-specific manner. In this case, one or more SCI occasions may be preconfigured, and the SCI or short-term reservation message may include information indicating specific SCI occasion(s) among the one or more SCI occasions. The SCI or short-term reservation message including information indicating specific SCI occasion(s) may be transmitted to the terminal. The terminal may perform a monitoring operation (e.g., blind decoding operation) to obtain SCI in the specific SCI occasion(s) indicated by the SCI or the short-term reservation message. Here, the one or more SCI occasions may be configured by higher layer signaling. Alternatively, the one or more SCI occasions may be predefined in a technical specification.

A plurality of SCI occasions may be defined as shown in Table 6 below. Time and frequency resources for each of the SCI occasions #1 to #4 may be configured. In the time and frequency domain, one SCI occasion may not overlap with another SCI occasion. Alternatively, one SCI occasion may overlap with another SCI occasion in the time and frequency domains.

TABLE 6

| SCI occasion | Resource region of SCI occasion |
|---|---|
| SCI occasion #1 | Time resource information #1 |
| (bits: 00) | Frequency resource information #1 |
| SCI occasion #2 | Time resource information #2 |
| (bits: 01) | Frequency resource information #2 |
| SCI occasion #3 | Time resource information #3 |
| (bits: 10) | Frequency resource information #3 |
| SCI occasion #4 | Time resource information #4 |
| (bits: 11) | Frequency resource information #4 |

In Table 6, time resource information may indicate specific time resource(s) (e.g., symbol index), and frequency resource information may indicate specific frequency resource(s) (e.g., PRB index, RB set index). Alternatively, in Table 6, the time resource information may be a relative value (e.g., time offset) for a specific time resource region (e.g., resource pool or PSCCH-PSSCH resource region), and the frequency resource information may be a relative value (e.g., frequency offset) for a specific resource region (e.g., resource pool or PSCCH-PSSCH resource region).

The resource region for each SCI occasion defined in Table 6 may be configured by higher layer signaling and/or MAC signaling, and the SCI or short-term reservation message may include information (e.g., 00, 01, 10, or 11) indicating one SCI occasion among the SCI occasions #1 to #4 configured through higher layer signaling and/or MAC signaling. The one SCI occasion among the SCI occasions #1 to #4 configured through higher layer signaling and/or MAC signaling may be indicated by another scheme (e.g., an explicit scheme, an implicit scheme, or a combination of the explicit scheme and the implicit scheme).

The SCI occasion may be configured in an SL-specific manner. The SCI transmitted on the PSCCH #n shown in FIG. 11 may indicate an SCI occasion within the PSCCH-PSSCH resource region #m. The SCI occasion within the PSCCH-PSSCH resource region #m may be changed (e.g., reconfigured) by the SCI transmitted on the PSCCH #n.

The resource region of the SCI occasion may be configured according to a size and/or position of each of a PSCCH resource region, a PSSCH resource region, a PSCCH-PSSCH resource region, and a resource region of a resource pool. For example, the resource region of the SCI occasion may be configured as shown in Table 7 below. In Table 7, the resource region may be a PSCCH resource region, a PSSCH resource region, a PSCCH-PSSCH resource region, or a resource region of a resource pool.

TABLE 7

| SCI occasion | Resource region of SCI occasion |
|---|---|
| Time resource: y or less symbols | Time resource: first symbol |
| Frequency resource: x or more PRBs | Frequency resource: frequency resource region #0 |
| Time resource: y or more symbols | Time resource: first symbol |
| Frequency resource: x or more PRBs | Frequency resource: frequency resource region #1 |
| Time resource: y or more symbols | Time resource: first symbol or second symbol |
| Frequency resource: x or less PRBs | Frequency resource: frequency resource region #0 |
| Time resource: y or less symbols | Time resource: first symbol or second symbol |
| Frequency resource: x or less PRBs | Frequency resource: frequency resource region #1 |

The configuration information defined in Table 7 may be configured by higher layer signaling and/or MAC signaling.

The receiving terminal may receive an SCI and/or short-term reservation message from the transmitting terminal, and based on information included in the SCI and/or the short-term reservation message, may identify a size of a PSCCH resource region, a PSSCH resource region, a PSCCH-PSSCH resource region, or a resource region of a resource pool. The receiving terminal may select an SCI occasion mapped to the identified size from among the SCI occasions configured by higher layer signaling and/or MAC signaling, and may perform a blind decoding operation on the selected SCI occasion.

The configuration information defined in Table 7 may be indicated according to a cell-specific manner, a UE-specific manner, a resource pool-specific manner, or an SL-specific manner. In exemplary embodiments, the SCI occasion may be a resource region on which the terminal performs a blind decoding operation to obtain SCI. In exemplary embodiments, the configuration information configured by higher layer signaling may be changed by another higher layer signaling, MAC signaling, and/or PHY signaling (e.g., SCI, short-term reservation message).

Sidelink resources (e.g., resource pool, PSCCH-PSSCH resource region) may be configured in units of slots. In this case, time resources of the SCI occasion may be composed of x symbols from the first symbol within the slot. Here, x may be a natural number. The SCI occasion may be configured in a cell-specific manner, in a UE-specific manner, in a resource pool-specific manner, or in an SL-specific manner. The resource region of the SCI occasion may be configured as a fixed resource region. The configuration information of the SCI occasion may be transmitted through one or a combination of two or more of higher layer signaling, MAC signaling, and PHY signaling.

[Multi-SCI Scheme]

When the multi-SCI scheme is used, a transmitting terminal may transmit two SCIs (e.g., 1st-stage SCI and 2nd-stage SCI) to a receiving terminal, and transmit data on a PSSCH indicated by the SCI(s) to the receiving terminal. The receiving terminal may receive the two SCIs from the transmitting terminal by performing a monitoring operation on sidelink channel(s) (e.g., PSCCH and/or PSSCH), and may receive the data from the transmitting terminal on the PSSCH indicated by the SCI(s). The SCI(s) may be used for resource reservation for PSCCH and/or PSSCH. The two SCIs may be transmitted on different PSCCHs. Alternatively, the 1st-stage SCI may be transmitted on the PSCCH, and the 2nd-stage SCI may be transmitted on the PSSCH. For example, the 2nd-stage SCI may be transmitted on the PSSCH together with the data. That is, the 2nd-stage SCI and the data may be multiplexed in the PSSCH. Alternatively, the 2nd-stage SCI may be included in a higher layer header and/or MAC CE transmitted on the PSSCH.

Information for reception of the 2nd-stage SCI (e.g., information indicating whether the 2nd-stage SCI is transmitted, resource allocation information and MCS information of the 2nd-stage SCI) may be indicated by an explicit scheme and/or an implicit scheme. For example, the 1st-stage SCI may include information for reception of the 2nd-stage SCI. The 1st-stage SCI may include MCS information of the 2nd-stage SCI as well as MCS information of the data scheduled by the 1st-stage SCI.

When the multi-SCI scheme is used, an SCI occasion may include a first SCI occasion in which the 1st-stage SCI may be transmitted and a second SCI occasion in which the 2nd-stage SCI may be transmitted. In exemplary embodiments, the SCI occasion may refer to the 'first SCI occasion', 'second SCI occasion', or 'SCI occasion including the first SCI occasion and the second SCI occasion'. Configuration information of the first SCI occasion and the second SCI occasion may be included in the SCI and/or the short-term reservation message. The SCI (or short-term reservation message) including the configuration information of the first SCI occasion and the second SCI occasion may be transmitted in an SCI occasion (e.g., resource region) located prior to the first SCI occasion and the second SCI occasion. The first SCI occasion and the second SCI occasion may be configured as follows.

Figure 12:
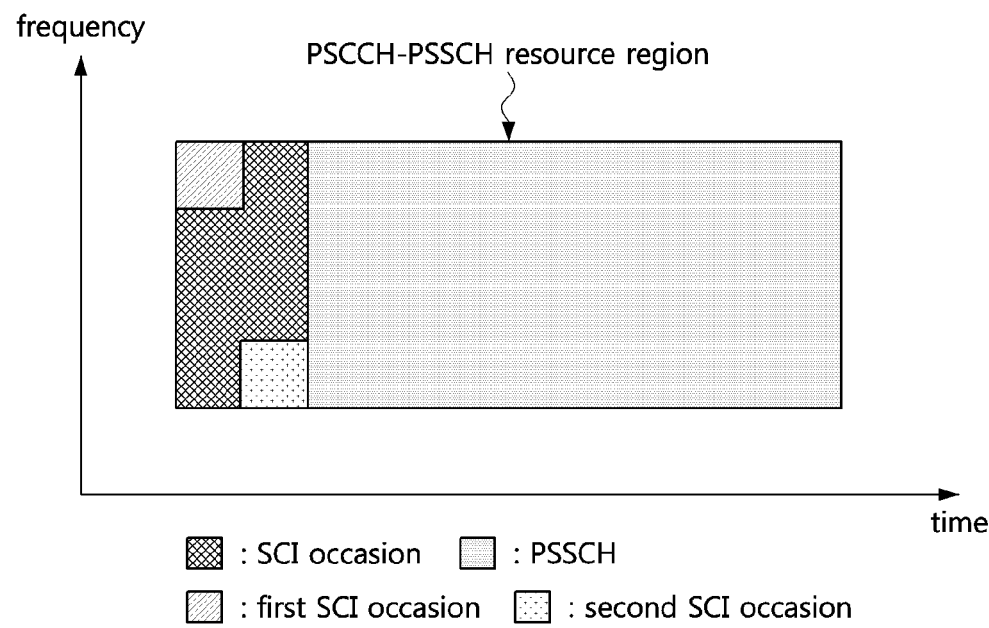
FIG. 12 is a conceptual diagram illustrating a first exemplary embodiment of an SCI occasion in a communication system supporting sidelink communication.

FIG. 12 is a conceptual diagram illustrating a first exemplary embodiment of an SCI occasion in a communication system supporting sidelink communication.

As shown in FIG. 12, a PSCCH-PSSCH resource region may include an SCI occasion and a PSSCH. The SCI occasion may include a first SCI occasion and a second SCI occasion. The first SCI occasion may be a PSCCH, and the second SCI occasion may be a PSCCH or PSSCH. The PSCCH in which the first SCI occasion is located may be different from the PSCCH in which the second SCI occasion is located. The SCI occasion, the first SCI occasion, the second SCI occasion, the PSSCH, and the PSCCH-PSSCH resource region may be expressed as a set of time-frequency resources. Each of the SCI occasion, the first SCI occasion, the second SCI occasion, the PSSCH, and the PSCCH-PSSCH resource region may be indicated by a combination of two or more of a symbol index, number of symbols, slot index, number of slots, RE index, number of REs, subcarrier index, number of subcarriers, PRB index, number of PRBs, RB set index, number of RB sets, subchannel index, and number of subchannels. The SCI occasion shown in FIG. 12 may be applied to the single-SCI scheme as well as the multi-SCI scheme.

The receiving terminal may receive a 1st-stage SCI by performing a blind decoding operation on the first SCI occasion, and may determine a position of the second SCI occasion based on information element(s) included in the 1st-stage SCI. The receiving terminal may receive a 2nd-stage SCI in the second SCI occasion. When the receiving terminal knows the reception position of the 2nd-stage SCI, the blind decoding operation on the second SCI occasion may not be performed. Here, the 1st-stage SCI may include resource allocation information of the 2nd-stage SCI. The resource allocation information included in the 1st-stage SCI may indicate absolute physical resources of the second SCI occasion in which the 2nd-stage SCI is transmitted. Alternatively, the resource allocation information included in the 1st-stage SCI may indicate a relative offset between a specific resource region (e.g., SCI occasion, first SCI occasion) and the second SCI occasion in which 2nd-stage SCI is transmitted.

When the resource allocation information included in the 1st-stage SCI indicates the second SCI occasion, the second SCI occasion may be indicated through a combination of two or more of a symbol index, number of symbols, slot index, number of slots, RE index, number of REs, subcarrier index, number of subcarriers, PRB index, number of PRBs, RB set index, number of RB sets, subchannel index, and number of subchannels.

Alternatively, the 1st-stage SCI may not include the resource allocation information of the 2nd-stage SCI. In this case, the terminal may estimate the position of the second SCI occasion based on the position of the first SCI occasion. A mapping relationship between the first SCI occasion and the second SCI occasion may be indicated through one or a combination of two or more of higher layer signaling, MAC signaling, and PHY signaling. Alternatively, the mapping relationship between the first SCI occasion and the second SCI occasion may be predefined in a technical specification.

Figure 13:
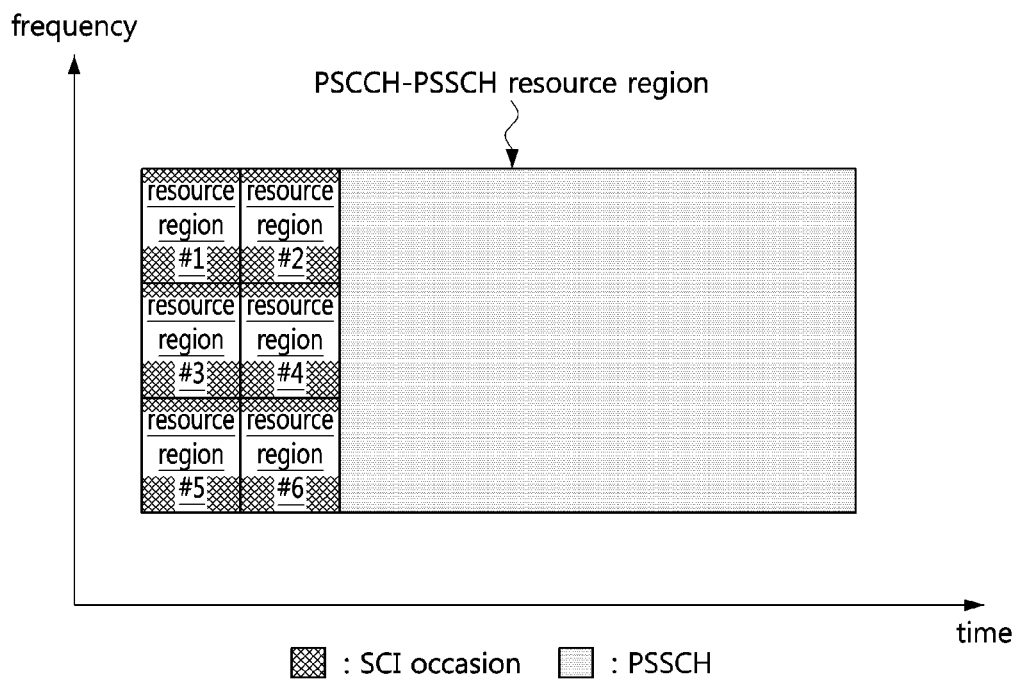
FIG. 13 is a conceptual diagram illustrating a second exemplary embodiment of an SCI occasion in a communication system supporting sidelink communication.

FIG. 13 is a conceptual diagram illustrating a second exemplary embodiment of an SCI occasion in a communication system supporting sidelink communication.

As shown in FIG. 13, a PSCCH-PSSCH resource region may include an SCI occasion and a PSSCH. The SCI occasion may be divided into a plurality of resource regions. A mapping relationship (e.g., association relationship) between a resource region (e.g., first SCI occasion) in which a 1st-stage SCI is transmitted and a resource region (e.g., second SCI occasion) in which a 2nd-stage SCI is transmitted may be configured. The mapping relationship (e.g., association relationship) may be defined as shown in Table 8 below.

TABLE 8

| Resource region in which $1^{st}$-stage SCI is transmitted | Resource region in which $2^{nd}$-stage SCI is transmitted |
|---|---|
| Resource region #1 | Resource region #6 |
| Resource region #3 | Resource region #4 + Resource region #6 |
| Resource region #5 | Resource region #2 |
| Resource region #1 + Resource region #3 | Resource region #4 + Resource region #6 |
| Resource region #1 + Resource region #2 | Resource region #5 + Resource region #6 |
| Resource region #3 + Resource region #5 | Resource region #2 + Resource region #4 + Resource region #6 |

The configuration information defined in Table 8 (e.g., information of resource regions included in the SCI occasion, mapping information) may be transmitted through one or a combination of two or more of higher layer signaling, MAC signaling, and PHY signaling. The resource region in which the 2nd-stage SCI is transmitted may be determined based on the resource region in which the 1st-stage SCI is transmitted. For example, when the 1st-stage SCI is received in the resource region #1, the receiving terminal may perform a monitoring operation on the resource region #2 to receive the 2nd-stage SCI. One or more resource regions may be used according to the size of format of the SCI. For example, the 1st-stage SCI may be transmitted in the resource regions #1 and #3, and the 2nd-stage SCI associated with the 1st-stage SCI may be transmitted in the resource regions #4 and #6.

The SCI occasion (e.g., resource regions constituting the SCI occasion) may be configured within a resource pool (e.g., PSCCH-PSSCH resource region) configured by higher layer signaling. Time resources of the SCI occasion may consist of x symbol(s) from the first symbol within the resource pool. Here, x may be a natural number. Frequency resources of the SCI occasion may be all frequency resources or some frequency resources of the resource pool. The frequency resources of the SCI occasion may vary according to the number x of symbols constituting the time resources of the corresponding SCI occasion. Alternatively, the SCI occasion may be configured as a fixed resource region.

The resource regions #1 to #6 may be indicated directly or indirectly in consideration of the resource pool, the PSCCH-PSSCH resource region, the sidelink resources, and/or the SCI occasion. The 2nd-stage SCI may be transmitted in a resource region having the same frequency resource as the resource region in which the 1st-stage SCI is transmitted. Alternatively, a start position of the resources in which the 2nd-stage SCI is transmitted may be configured based on a frequency resource of the resource region in which the 1st-stage SCI is transmitted.

Figure 14:
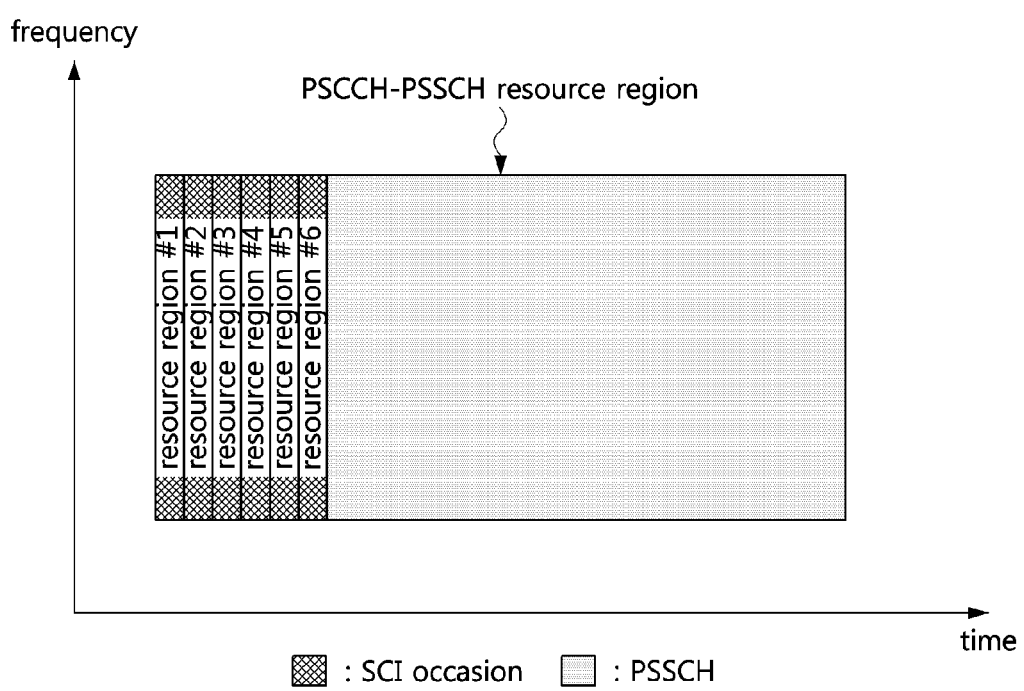
FIG. 14 is a conceptual diagram illustrating a third exemplary embodiment of an SCI occasion in a communication system supporting sidelink communication.

FIG. 14 is a conceptual diagram illustrating a third exemplary embodiment of an SCI occasion in a communication system supporting sidelink communication.

As shown in FIG. 14, a PSCCH-PSSCH resource region may include an SCI occasion and a PSSCH. The SCI occasion may be divided into a plurality of resource regions. A mapping relationship (e.g., association relationship) between a resource region (e.g., first SCI occasion) in which a 1st-stage SCI is transmitted and a resource region (e.g., second SCI occasion) in which a 2nd-stage SCI is transmitted may be configured. The mapping relationship (e.g., association relationship) may be defined as shown in Table 9 below.

TABLE 9

| Resource region in which $1^{st}$-stage SCI is transmitted | Resource region in which $2^{nd}$-stage SCI is transmitted |
|---|---|
| Resource region #1 | Resource region #2 |
| Resource region #1 | Resource region #2 + Resource region #3 |
| Resource region #1 + Resource region #2 | Resource region #3 |
| Resource region #1 + Resource region #2 | Resource region #3 + Resource region #4 |
| Resource region #1 + Resource region #2 | Resource region #3 + Resource region #4 + Resource region #5 |
| Resource region #1 + Resource region #2 | Resource region #3 + Resource region #4 + Resource region #5 + Resource region #6 |

The resource regions #1 to #6 may be configured in units of symbols or slots. In the frequency domain, one resource region may include all frequency resources or some frequency resources configured for sidelink communication. In order to quickly obtain the 2nd-stage SCI, resource region(s) adjacent to the resource region(s) in which the 1st-stage SCI is transmitted may be configured for transmission of the 2nd-stage SCI. Alternatively, various resource allocation schemes may be used to configure the resource regions.

The configuration information defined in Table 9 (e.g., information of resource regions included in the SCI occasion, mapping information) may be transmitted through one or a combination of two or more of higher layer signaling, MAC signaling, and PHY signaling. The resource region in which the 2nd-stage SCI is transmitted may be determined based on the resource region in which the 1st-stage SCI is transmitted. For example, if the 1st-stage SCI is received in the resource region #1, the terminal may perform a monitoring operation on the resource region #2 or the resource regions #2 and #3 in order to receive the 2nd-stage SCI. One or more resource regions may be used according to the size and/or format of the SCI. For example, the 1st-stage SCI may be transmitted in the resource regions #1 and #2, and the 2nd-stage SCI associated with the 1st-stage SCI may be transmitted in the resource regions #3 and #4.

The resource regions #1 to #6 may be indicated directly or indirectly in consideration of the resource pool, PSCCH-PSSCH resource region, sidelink resources, and/or SCI occasion. In order to quickly obtain the two SCIs and improve the efficiency of resource allocation, the SCI occasion may be configured as follows.

Figure 15A:
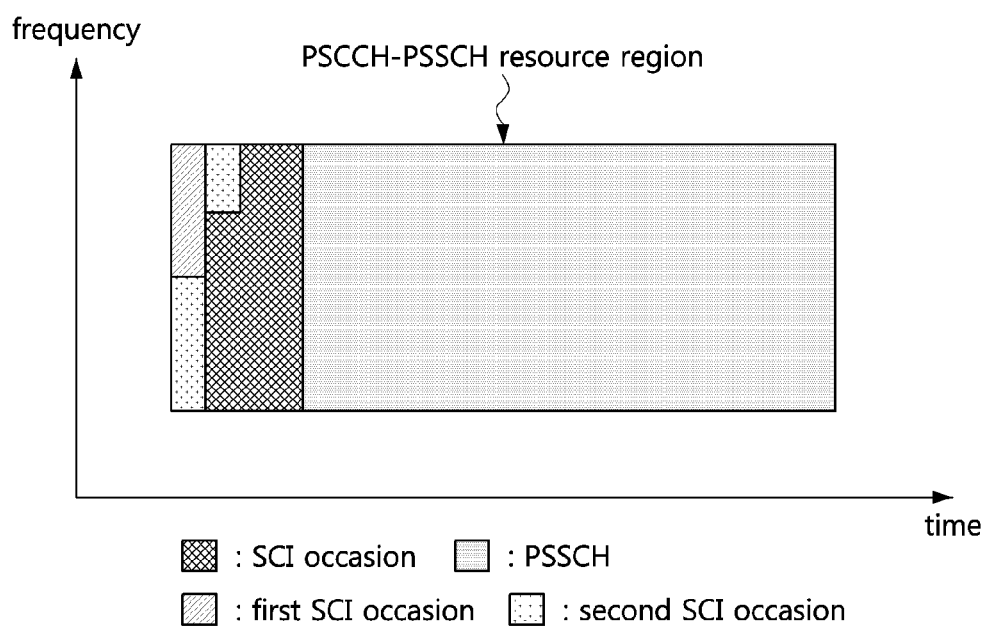
FIG. 15A is a conceptual diagram illustrating a fourth exemplary embodiment of an SCI occasion in a communication system supporting sidelink communication.
Figure 15B:
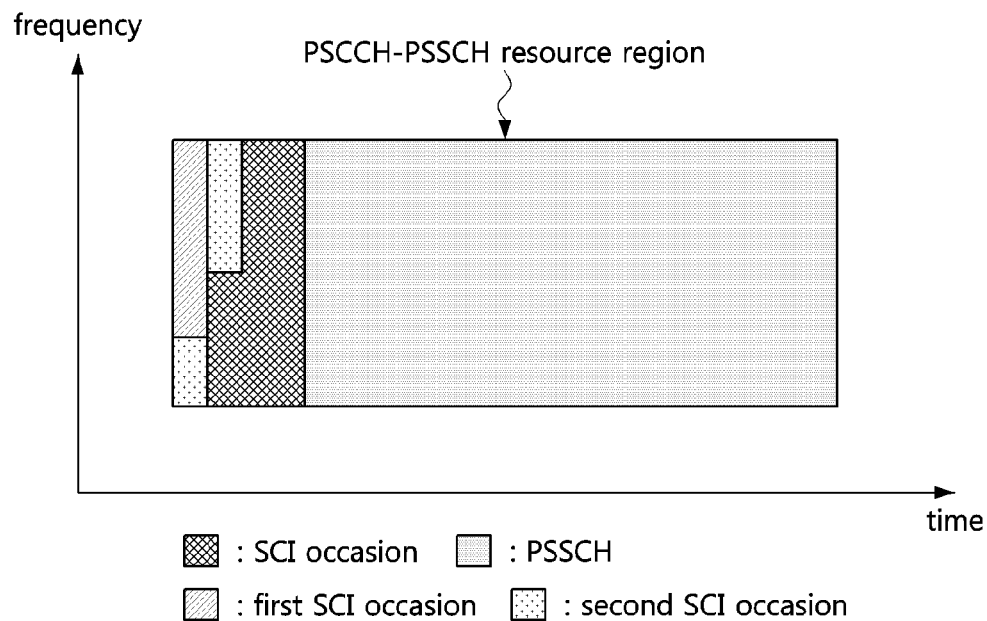
FIG. 15B is a conceptual diagram illustrating a fifth exemplary embodiment of an SCI occasion in a communication system supporting sidelink communication.
Figure 15C:
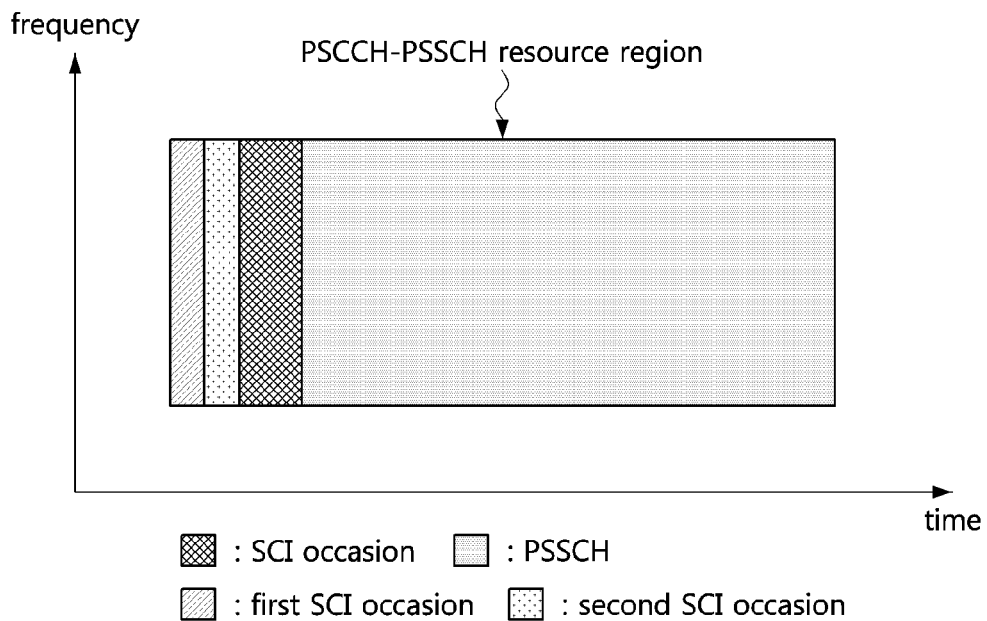
FIG. 15C is a conceptual diagram illustrating a sixth exemplary embodiment of an SCI occasion in a communication system supporting sidelink communication.
Figure 15D:
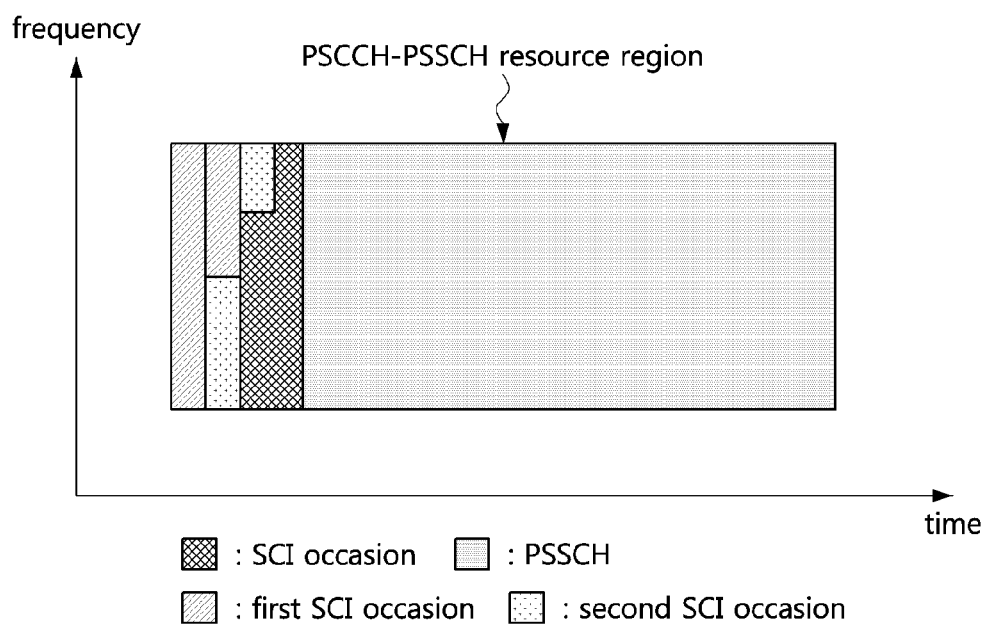
FIG. 15D is a conceptual diagram illustrating a seventh exemplary embodiment of an SCI occasion in a communication system supporting sidelink communication.

FIG. 15A is a conceptual diagram illustrating a fourth exemplary embodiment of an SCI occasion in a communication system supporting sidelink communication, FIG. 15B is a conceptual diagram illustrating a fifth exemplary embodiment of an SCI occasion in a communication system supporting sidelink communication, FIG. 15C is a conceptual diagram illustrating a sixth exemplary embodiment of an SCI occasion in a communication system supporting sidelink communication, and FIG. 15D is a conceptual diagram illustrating a seventh exemplary embodiment of an SCI occasion in a communication system supporting sidelink communication.

As shown in FIGS. 15A to 15D, a PSCCH-PSSCH resource region may include an SCI occasion and a PSSCH. A first SCI occasion and a second SCI occasion may be configured within the SCI occasion. A 1st-stage SCI and a 2nd-stage SCI may be mapped based on the frequency-first scheme or the time-first scheme. Alternatively, the 1st-stage SCI and the 2nd-stage SCI may be mapped according to a preconfigured mapping rule. The 1st-stage SCI may be mapped from a start subcarrier in the first symbol of the PSCCH-PSSCH resource region (e.g., sidelink resources, resource pool). The start subcarrier may be a subcarrier having the lowest frequency or the highest frequency among frequency resources of the PSCCH-PSSCH resource region. After the mapping of the 1st-stage SCI is completed, the 2nd-stage SCI may be mapped. For example, the 2nd-stage SCI may be mapped from resources after an end resource among resources to which the 1st-stage SCI is mapped. The 1st-stage SCI and 2nd-stage SCI may be mapped to contiguous resources. In this case, the receiving terminal may obtain the 2nd-stage SCI immediately after succeeding in decoding of the 1st-stage SCI.

The size of the resource region (e.g., the first SCI occasion) in which the 1st-stage SCI is transmitted may be set to be the same as or similar to that of the above-described single-SCI scheme. The size of the resource region (e.g., the second SCI occasion) in which the 2nd-stage SCI is transmitted may be set in consideration of a size, format, MCS level, or the like of the 2nd-stage SCI. Referring to Table 10 below, the number of REs allocated for transmission of the 2nd-stage SCI may be set for each resource allocation format of 2nd-stage SCI.

TABLE 10

| Resource allocation format | Number of REs allocated for transmission 2nd-stage SCI |
|---|---|
| Resource allocation format #1 (bits: 00) | 8 REs |
| Resource allocation format #2 (bits: 01) | 16 REs |
| Resource allocation format #3 (bits: 10) | 24 REs |
| Resource allocation format #4 (bits: 11) | 32 REs |

The configuration information defined in Table 10 may include one or more of information on resource allocation formats of the 2nd-stage SCI, information on the numbers of REs allocated for transmission of the 2nd-stage SCI, and information on a mapping relationship between a resource allocation format of the 2nd-stage SCI and the number of REs allocated for transmission of the 2nd-stage SCI. The configuration information defined in Table 10 may be transmitted through one or a combination of two or more of higher layer signaling, MAC signaling, and PHY signaling.

The transmitting terminal may determine a resource allocation format of the 2nd-stage SCI, and may map the 2nd-stage SCI to REs according to the determined resource allocation format within the PSCCH-PSSCH resource region (e.g., sidelink resources, resource pool). Information (e.g., 00, 01, 10, 11) indicating the determined resource allocation format may be transmitted through the 1st-stage SCI. The above-described operation may be performed regardless of the size of the frequency resources of the PSCCH-PSSCH resource region.

In Table 10, the resource allocation format may be mapped to the number of PRBs, the number of subchannels, or the number of RB sets allocated for transmission of the 2nd-stage SCI instead of the number of REs. A minimum unit of resources used for transmission of the 2nd-stage SCI may be configured as x REs (or PRBs, subchannels, RB sets), and (x×i) REs (or PRBs, subchannels, RB sets) may be used for transmission of the 2nd-stage SCI depending on a size of a physical channel used for transmission of the 2nd-stage SCI. Alternatively, the minimum resources used for transmission of the 2nd-stage SCI may be configured as x REs (or PRBs, subchannels, RB sets), and the maximum resources used for transmission of the 2nd-stage SCI Resources may be configured as y REs (or PRBs, subchannels, RB sets). In this case, the 2nd-stage SCI may be transmitted using x or more and y or less REs (or PRBs, subchannels, RB sets). Here, each of x, y, and i may be a natural number. Each of x, y, and i may be indicated by one or a combination of two or more of higher layer signaling, MAC signaling, and PHY signaling.

An allocation unit of the resource region (e.g., first SCI occasion) for transmission of the 1st-stage SCI may be configured independently of an allocation unit of the resource region (e.g., second SCI occasion) for transmission of the 2nd-stage SCI. Alternatively, an allocation unit for the resource region for transmission of the 1st-stage SCI and the resource region for transmission of the 2nd-stage SCI may be configured in common.

Figure 16A:
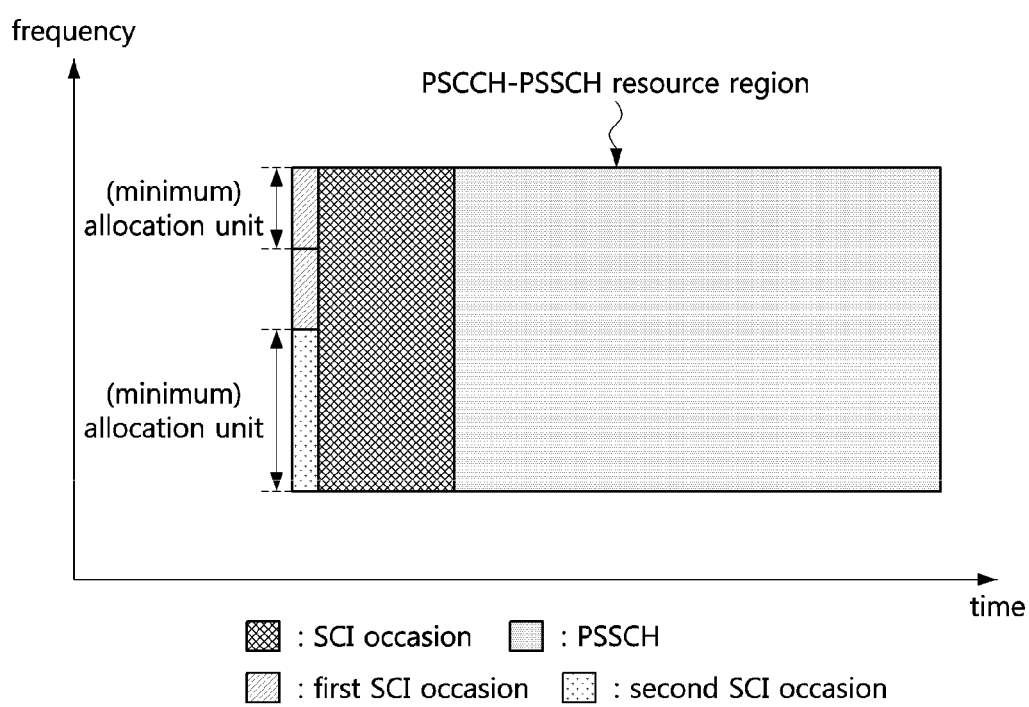
FIG. 16A is a conceptual diagram illustrating an eighth exemplary embodiment of an SCI occasion in a communication system supporting sidelink communication.
Figure 16B:
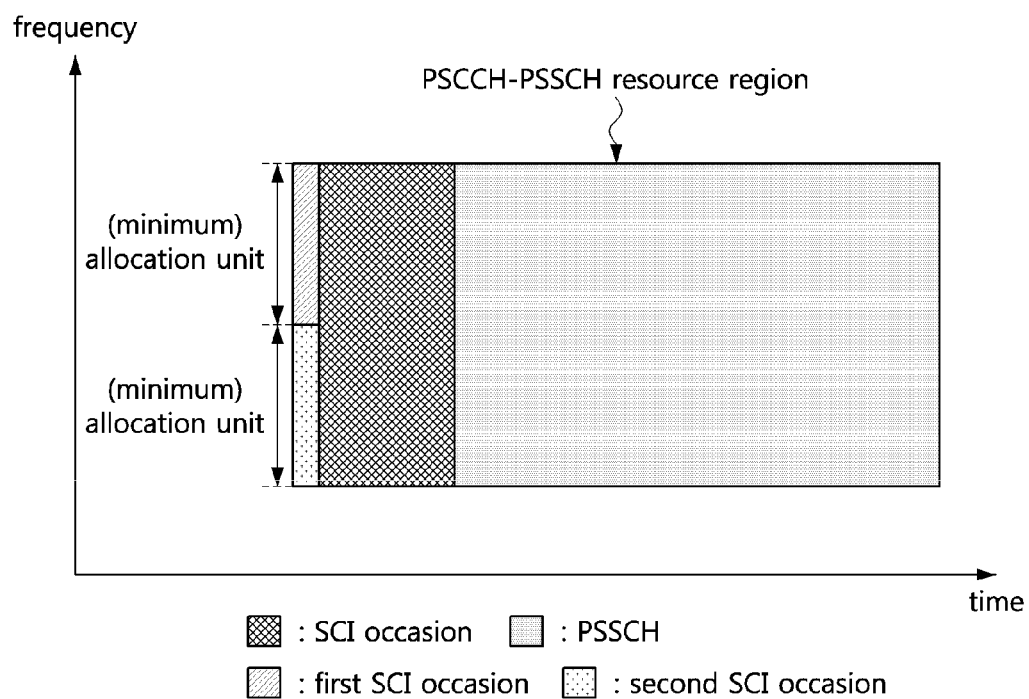
FIG. 16B is a conceptual diagram illustrating a ninth exemplary embodiment of an SCI occasion in a communication system supporting sidelink communication.

FIG. 16A is a conceptual diagram illustrating an eighth exemplary embodiment of an SCI occasion in a communication system supporting sidelink communication, and FIG. 16B is a conceptual diagram illustrating a ninth exemplary embodiment of an SCI occasion in a communication system supporting sidelink communication.

As shown in FIGS. 16A and 16B, a PSCCH-PSSCH resource region may include an SCI occasion and a PSSCH. A first SCI occasion and a second SCI occasion may be configured within the SCI occasion. In the exemplary embodiment shown in FIG. 16A, an allocation unit (e.g., minimum allocation unit) of a resource region for transmission of 1st-stage SCI may be configured differently from an allocation unit (e.g., minimum allocation unit) of a resource region for transmission of 2nd-stage SCI. Two resource regions may be allocated for transmission of the 1st-stage SCI, and one resource region may be allocated for transmission of the 2nd-stage SCI.

In the exemplary embodiment shown in FIG. 16B, the allocation unit (e.g., minimum allocation unit) of the resource region for transmission of the 1st-stage SCI may be configured identically to the allocation unit (e.g., minimum allocation unit) of the resource region for transmission of the 2nd-stage SCI. That is, a common allocation unit may be used for the 1st-stage SCI and the 2nd-stage SCI. One resource region may be allocated for transmission of the 1st-stage SCI, and one resource region may be allocated for transmission of the 2nd-stage SCI.

The allocation unit (e.g., minimum allocation unit) of the resource region may be configured in units of common frequency units, PRBs, subchannels, or RB sets. When the allocation unit (e.g., minimum allocation unit) of the resource region for transmission of the 1st-stage SCI is different from the allocation unit (e.g., minimum allocation unit) of the resource region for transmission of the 2nd-stage SCI, the allocation unit (e.g., minimum allocation unit) of the resource region for transmission of the 1st-stage SCI may be a multiple of the allocation unit (e.g., minimum allocation unit) of the resource region for transmission of the 2nd-stage SCI. Alternatively, the allocation unit (e.g., minimum allocation unit) of the resource region for transmission of the 2nd-stage SCI may be a multiple of the allocation unit (e.g., minimum allocation unit) of the resource region for transmission of the 1st-stage SCI.

The allocation unit (e.g., minimum allocation unit) of the resource region may be indicated by one or a combination of two or more of higher layer signaling, MAC signaling, and PHY signaling. The allocation unit (e.g., minimum allocation unit) of the resource region may be indicated in a cell-specific manner, a resource pool-specific manner, an SL-specific manner, or a UE-specific manner.

Figure 17A:
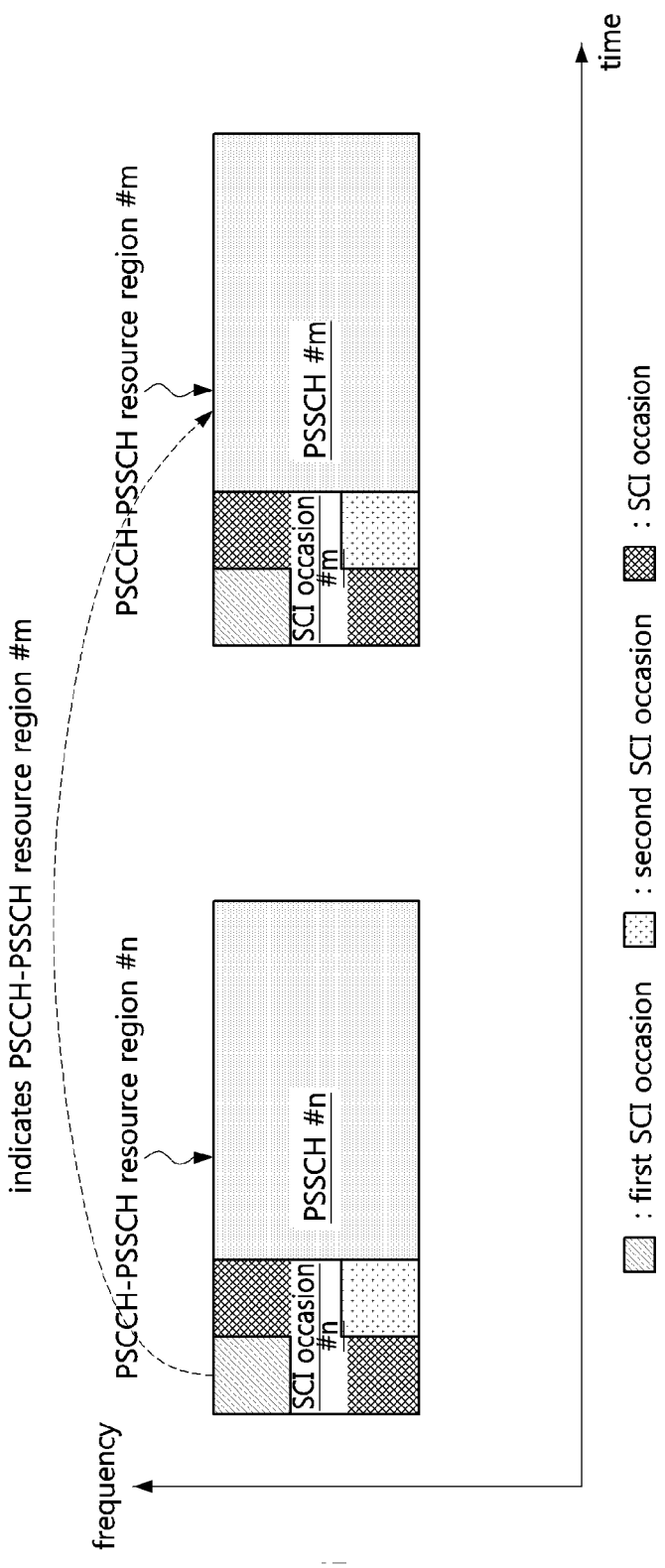
FIG. 17A is a conceptual diagram illustrating a second exemplary embodiment of a method of indicating a PSCCH-PSSCH resource region in a communication system supporting sidelink communication.
Figure 17B:
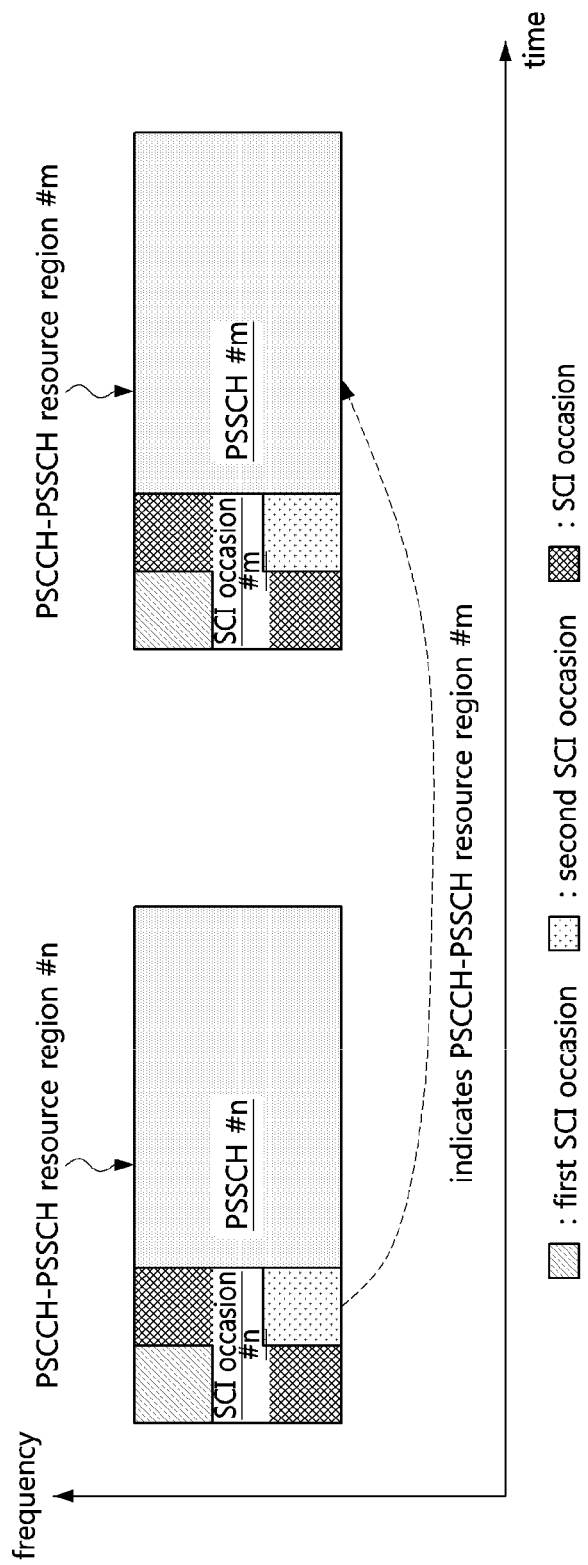
FIG. 17B is a conceptual diagram illustrating a second exemplary embodiment of a method of indicating a PSCCH-PSSCH resource region in a communication system supporting sidelink communication.

FIG. 17A is a conceptual diagram illustrating a second exemplary embodiment of a method of indicating a PSCCH-PSSCH resource region in a communication system supporting sidelink communication, and FIG. 17B is a conceptual diagram illustrating a second exemplary embodiment of a method of indicating a PSCCH-PSSCH resource region in a communication system supporting sidelink communication.

As shown in FIGS. 17A and 17B, a PSCCH-PSSCH resource region #n may include an SCI occasion #n and a PSSCH #n, and a first SCI occasion #n and a second SCI occasion #n may be configured within the SCI occasion #n. A PSCCH-PSSCH resource region #m may include an SCI occasion #m and a PSSCH #m, and a first SCI occasion #m and a second SCI occasion #m may be configured within the SCI occasion #m. Here, n may be a natural number, and m may be a natural number greater than n.

The transmitting terminal may transmit SCI(s) including scheduling information (e.g., resource allocation information) of the PSSCH #n (e.g., data transmitted on the PSSCH #n) in the SCI occasion #n. In addition, the SCI(s) transmitted in the SCI occasion #n may further include configuration information of the PSCCH-PSSCH resource region #m. In the exemplary embodiment shown in FIG. 17A, the configuration information of the PSCCH-PSSCH resource region #m may be included in the 1st-stage SCI, and in the exemplary embodiment shown in FIG. 17B, the configuration information of the PSCCH-PSSCH resource region #m may be included in the 2nd-stage SCI. Alternatively, the configuration information of the PSCCH-PSSCH resource region #m may be included in another L1 signaling message (e.g., short-term reservation message) instead of the SCI(s).

When the SCI occasion #m does not need to be indicated (e.g., when configuration information of the SCI occasion #m does not need to be transmitted), the SCI or short-term reservation message transmitted on the SCI occasion #n may include configuration information of the PSSCH #m instead of the PSCCH-PSSCH resource region #m. In the exemplary embodiment shown in FIG. 17A, the configuration information of the PSSCH #m may be included in the 1st-stage SCI, and in the exemplary embodiment shown in FIG. 17B, the configuration information of the PSSCH #m may be included in the 2nd-stage SCI.

When the configuration of the SCI occasion #m is associated with the configuration of the PSSCH #m, the SCI transmitted in the SCI occasion #n may include configuration information of the SCI occasion #m belonging to the PSCCH-PSSCH resource region #m. In the exemplary embodiment shown in FIG. 17A, the configuration information of the SCI occasion #m may be included in 1st-stage SCI, and in the exemplary embodiment shown in FIG. 17B, the configuration information of SCI occasion #m may be included in the 2nd-stage SCI. In this case, the receiving terminal may estimate a position of the PSSCH #m based on the configuration information of the SCI occasion #m. A combination of the single-SCI scheme (e.g., the exemplary embodiment shown in FIG. 11) and multi-SCI schemes (e.g., the exemplary embodiment shown in FIGS. 17A and 17B) may be used.

Figure 18:
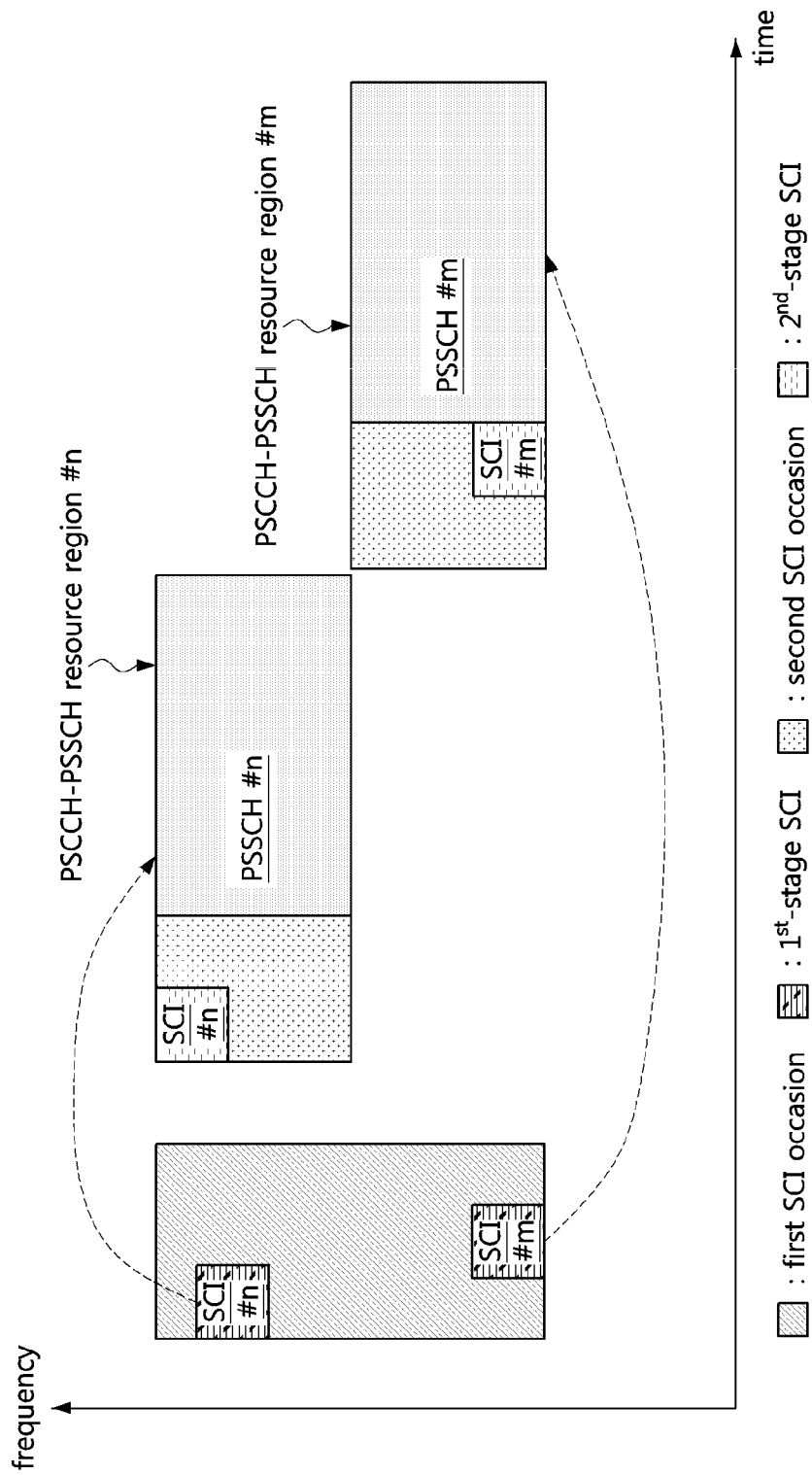
FIG. 18 is a conceptual diagram illustrating a fourth exemplary embodiment of a method of indicating a PSCCH-PSSCH resource region in a communication system supporting sidelink communication.

FIG. 18 is a conceptual diagram illustrating a fourth exemplary embodiment of a method of indicating a PSCCH-PSSCH resource region in a communication system supporting sidelink communication.

As shown in FIG. 18, a PSCCH-PSSCH resource region #n may include a second SCI occasion #n and a PSSCH #n, and a 2nd-stage SCI #n may be transmitted in the SCI occasion #n. A PSCCH-PSSCH resource region #m may include a second SCI occasion #m and a PSSCH #m, and a 2nd-stage SCI #m may be transmitted in the SCI occasion #m. Here, n may be a natural number, and m may be a natural number greater than n. 1st-stage SCIs #n and #m may be transmitted in a first SCI occasion. The 1st-stage SCI #n may include configuration information of the PSCCH-PSSCH resource region #n, and the 1st-stage SCI #m may include configuration information of the PSCCH-PSSCH resource region #m.

Sidelink communication may be performed using a resource pool allocated to terminal(s). The first SCI occasion may be configured as a specific resource region within the resource pool. Alternatively, the first SCI occasion may be configured independently of the resource pool. For example, the first SCI occasion may be configured as a specific resource region outside the resource pool.

In the exemplary embodiment shown in FIG. 18, a transmission operation of two data units may be performed. The transmission operation of two data units may be an operation between one transmitting terminal and one receiving terminal, an operation between one transmitting terminal and two receiving terminals, an operation between two transmitting terminals and one receiving terminal, or an operation between two transmitting terminals and two receiving terminals. Data #n may be transmitted on the PSSCH #n, and data #m may be transmitted on the PSSCH #m. The transmitting terminal may transmit the 1st-stage SCI #n including scheduling information (e.g., resource allocation information) of the data #n (e.g., second SCI occasion #n, PSSCH #n, PSCCH-PSSCH resource region #n) in the first SCI occasion. The receiving terminal may obtain the 1st-stage SCI #n by performing a monitoring operation (e.g., blind decoding operation) on the first SCI occasion, and based on information elements included in 1st-stage SCI #n, may identify the second SCI occasion #n, PSSCH #n, and/or PSCCH-PSSCH resource region #n. Here, the receiving terminal may know in advance the configuration information of the first SCI occasion. The receiving terminal may obtain the 2nd-stage SCI #n by performing a monitoring operation on the second SCI occasion #n, and based on the 1st-stage SCI #n and/or 2nd-stage SCI #n, may obtain the data #n from the PSSCH #n.

The transmitting terminal may transmit the 1st-stage SCI #m including scheduling information (e.g., resource allocation information) of the data #m (e.g., second SCI occasion #m, PSSCH #m, PSCCH-PSSCH resource region #m) in the first SCI occasion. The receiving terminal may obtain the 1st-stage SCI #m by performing a monitoring operation (e.g., blind decoding operation) on the first SCI occasion, and based on information elements included in 1st-stage SCI #m, may identify the second SCI occasion #m, PSSCH #m, and/or PSCCH-PSSCH resource region #m. Here, the receiving terminal may know in advance the configuration information of the first SCI occasion. The receiving terminal may obtain the 2nd-stage SCI #m by performing a monitoring operation on the second SCI occasion #m, and based on the 1st-stage SCI #m and/or 2nd-stage SCI #m, may obtain the data #m from the PSSCH #m.

The configuration information of the first SCI occasion may be transmitted through one or a combination of two or more of higher layer signaling, MAC signaling, and PHY signaling. The first SCI occasion configured by higher layer signaling may be changed by another higher layer signaling, MAC signaling, and/or PHY signaling. The first SCI occasion may be configured in a cell-specific manner, a resource pool-specific manner, a UE-specific manner, or an SL-specific manner.

When the first SCI occasion is configured in the resource pool-specific manner, the configuration information defined in Table 5 may be transmitted to the receiving terminal(s). The configuration information may include all parameters or some parameters necessary for performing the exemplary embodiment shown in FIG. 18. The configuration information may be indicated by a combination of parameters.

The SCI occasion (e.g., the first SCI occasion or the second SCI occasion) may be configured as a resource region in which a short-term reservation message can be transmitted. For example, the SCI occasion may be configured as a resource region in which transmission of a short-term reservation message is possible in the exemplary embodiment shown in FIG. 8 or the embodiment shown in FIG. 12. Alternatively, the 1st-stage SCI and the short-term reservation message may be transmitted together in the first SCI occasion.

The frequency resources of the second SCI occasion (e.g., the resource region in which the 2nd-stage SCI is transmitted) may be configured within the frequency resources of the first SCI occasion (e.g., the resource region in which the 1st-stage SCI is transmitted). The configuration scheme of the second SCI occasion (e.g., the resource region in which the 2nd-stage SCI is transmitted) may be the same as or similar to the configuration scheme of the SCI occasion (e.g., the resource region in which the SCI is transmitted) in the single-SCI scheme.

Figure 19A:
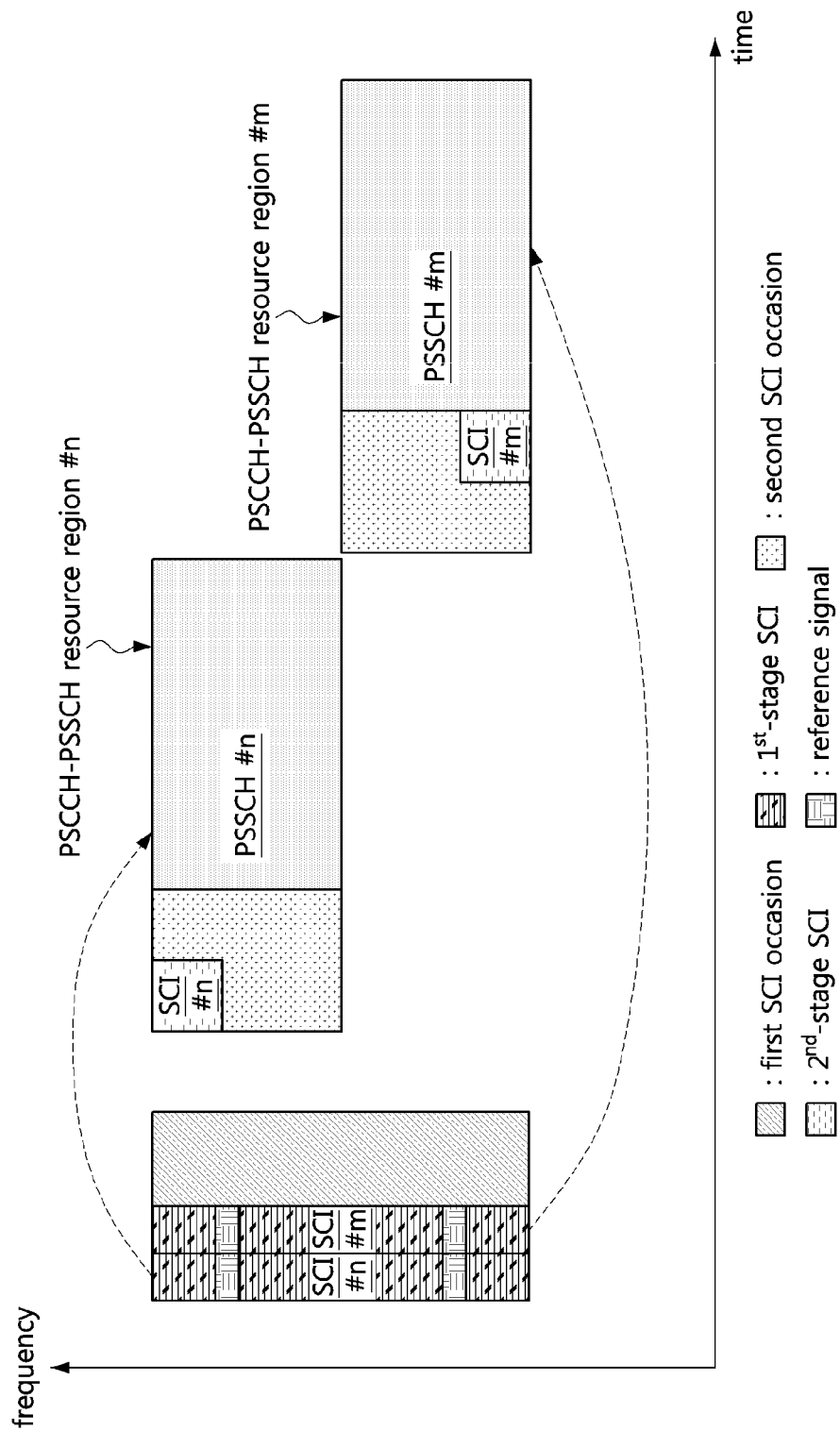
FIG. 19A is a conceptual diagram illustrating a fifth exemplary embodiment of a method of indicating a PSCCH-PSSCH resource region in a communication system supporting sidelink communication.
Figure 19B:
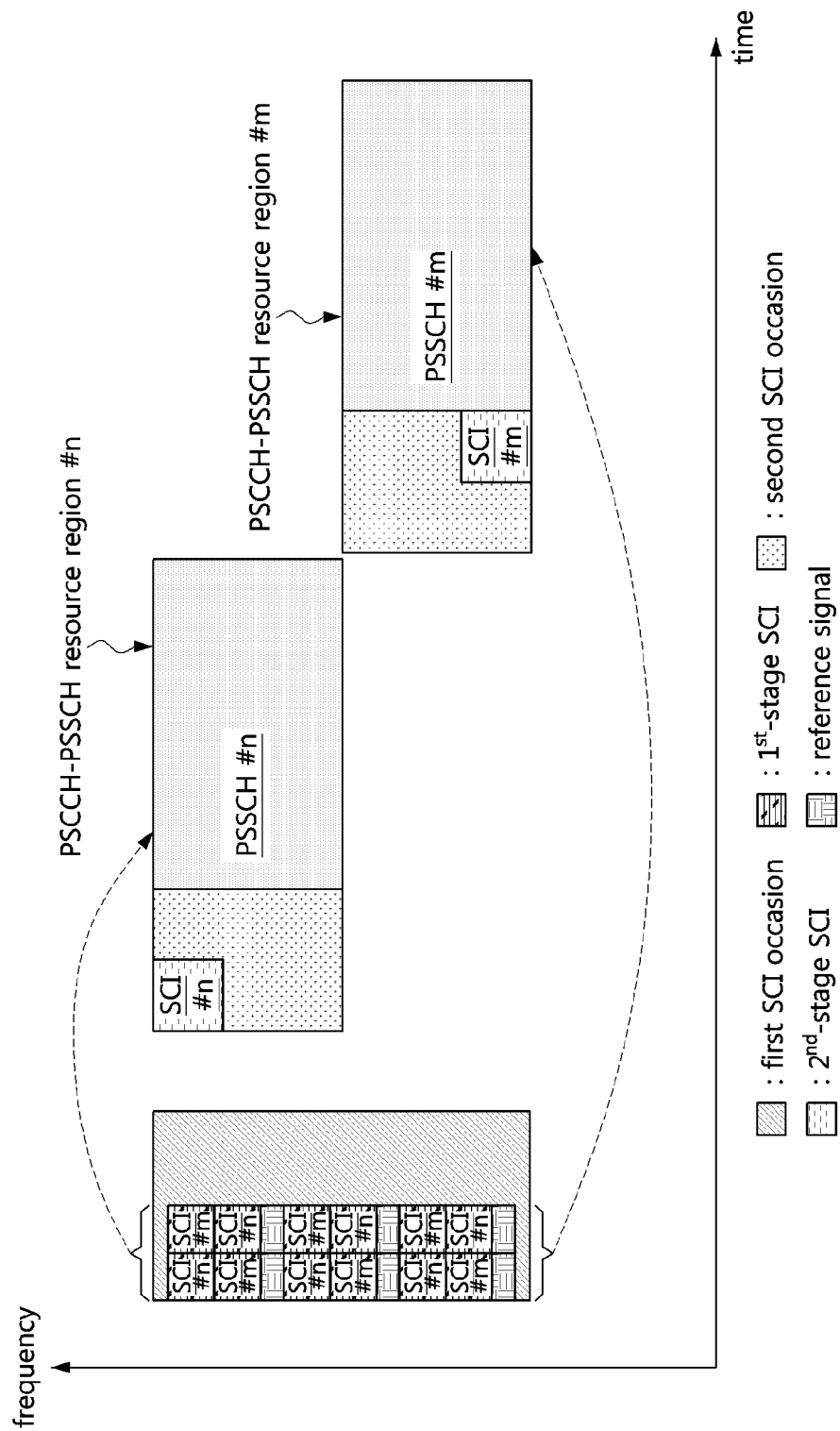
FIG. 19B is a conceptual diagram illustrating a sixth exemplary embodiment of a method of indicating a PSCCH-PSSCH resource region in a communication system supporting sidelink communication.

FIG. 19A is a conceptual diagram illustrating a fifth exemplary embodiment of a method of indicating a PSCCH-PSSCH resource region in a communication system supporting sidelink communication, and FIG. 19B is a conceptual diagram illustrating a sixth exemplary embodiment of a method of indicating a PSCCH-PSSCH resource region in a communication system supporting sidelink communication.

As shown in FIGS. 19A and 19B, a PSCCH-PSSCH resource region #n may include a second SCI occasion #n and a PSSCH #n, and a 2nd-stage SCI #n may be transmitted in the SCI occasion #n. A PSCCH-PSSCH resource region #m may include a second SCI occasion #m and a PSSCH #m, and a 2nd-stage SCI #m may be transmitted in the SCI occasion #m. Here, n may be a natural number, and m may be a natural number greater than n. 1st-stage SCIs #n and #m may be transmitted in a first SCI occasion. The 1st-stage SCI #n may include configuration information of the PSCCH-PSSCH resource region #n, and the 1st-stage SCI #m may include configuration information of the PSCCH-PSSCH resource region #m.

In the exemplary embodiment shown in FIG. 19A, the 1st-stage SCI may be mapped in units of symbols. The 1st-stage SCI may be mapped according to the time-first scheme or the frequency-first scheme. A reference signal (e.g., DM-RS) used for demodulation of the 1st-stage SCI may be allocated according to a specific pattern in a symbol(s) to which the 1st-stage SCI is allocated. The reference signal may be multiplexed with the 1st-stage SCI in the frequency domain. An index of the symbol in which the 1st-stage SCI #n is detected may indicate a position of the PSCCH-PSSCH resource region #n, and an index of the symbol in which the 1st-stage SCI #m is detected may indicate a position of the PSCCH-PSSCH resource region #m. The 2nd-stage SCI may be mapped in units of symbols. The 2nd-stage SCI may be mapped according to the time-first scheme or the frequency-first scheme In the exemplary embodiment shown in FIG. 19B, the 1st-stage SCI #n and the 1st-stage SCI #m may be multiplexed in the same symbol. In this case, the resource region for decoding the 1st-stage SCI #n and the 1st-stage SCI #m may be shared. A reference signal (e.g., DM-RS) used for demodulation of the 1st-stage SCI may be multiplexed in the symbol to which the 1st-stage SCI is allocated. The reference signal may be multiplexed with the 1st-stage SCI in the frequency domain. The resource(s) to which the 1st-stage SCI #n is mapped, the resource(s) to which the 1st-stage SCI #m is mapped, and the resource(s) to which the reference signal is mapped may be orthogonal to each other. In addition, the resource(s) to which the reference signal for demodulation of the 1st-stage SCI #n is mapped may be orthogonal to the resource(s) to which the reference signal for demodulation of the 1st-stage SCI #m is mapped. In order to improve the efficiency of resource use, the reference signal for demodulation of the 1st-stage SCI #n and the reference signal for demodulation of the 1st-stage SCI #m may be multiplexed in a code division multiplexing (CDM) scheme. The reference signal for demodulation of the 1st-stage SCI #n and the reference signal for demodulation of the 1st-stage SCI #m may be configured as follows.

Figure 20:
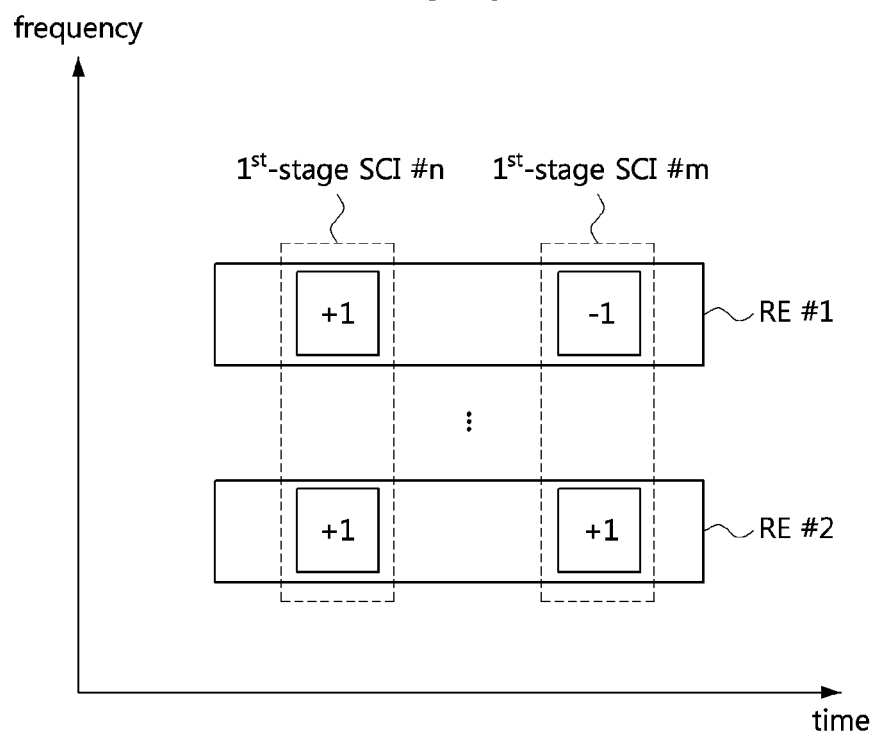
FIG. 20 is a conceptual diagram illustrating a first exemplary embodiment of reference signals in a communication system supporting sidelink communication.

FIG. 20 is a conceptual diagram illustrating a first exemplary embodiment of reference signals in a communication system supporting sidelink communication.

As shown in FIG. 20, in the time domain, a reference signal may be arranged in the same symbol as the symbol to which the 1st-stage SCI(s) is mapped or in a different symbol (e.g., neighboring symbol). If the symbol to which the reference signal is mapped is the same as the symbol to which the 1st-stage SCI(s) is mapped in the time domain, the reference signal may be arranged in RE(s) to which the 1st-stage SCI(s) is not mapped in the frequency domain. The reference signals may be arranged at regular intervals in the frequency domain.

The reference signal for the 1st-stage SCI #n and the reference signal for the 1st-stage SCI #m may be mapped to the same physical resource(s) (e.g., the same RE(s)). For example, the reference signal (+1) for the 1st-stage SCI #n and the reference signal (−1) for the 1st-stage SCI #m may be mapped to an RE #1, and the reference signal (+1) for the 1st-stage SCI #n and the reference signal (+1) for the 1st-stage SCI #m may be mapped to an RE #2. A channel state for the 1st-stage SCI #n may be defined as h1, and a channel state for the 1st-stage SCI #m may be defined as h2.

The receiving terminal may receive the reference signals from the transmitting terminal. For example, the receiving terminal may receive the reference signals in the RE #1, and the channel state estimated based on the reference signals may be 'h1−h2'. In addition, the receiving terminal may receive the reference signals in the RE #2, and the channel state estimated based on the reference signals may be 'h1+h2'. The receiving terminal may estimate each of h1 and h2 by using 'h1−h2' and 'h1+h2'. That is, the receiving terminal may estimate the channel state h1 and the channel state h2. The receiving terminal may perform an SCI reception operation based on the estimated channel states. Here, it is assumed that the channel states of adjacent REs are similar.

Figure 21:
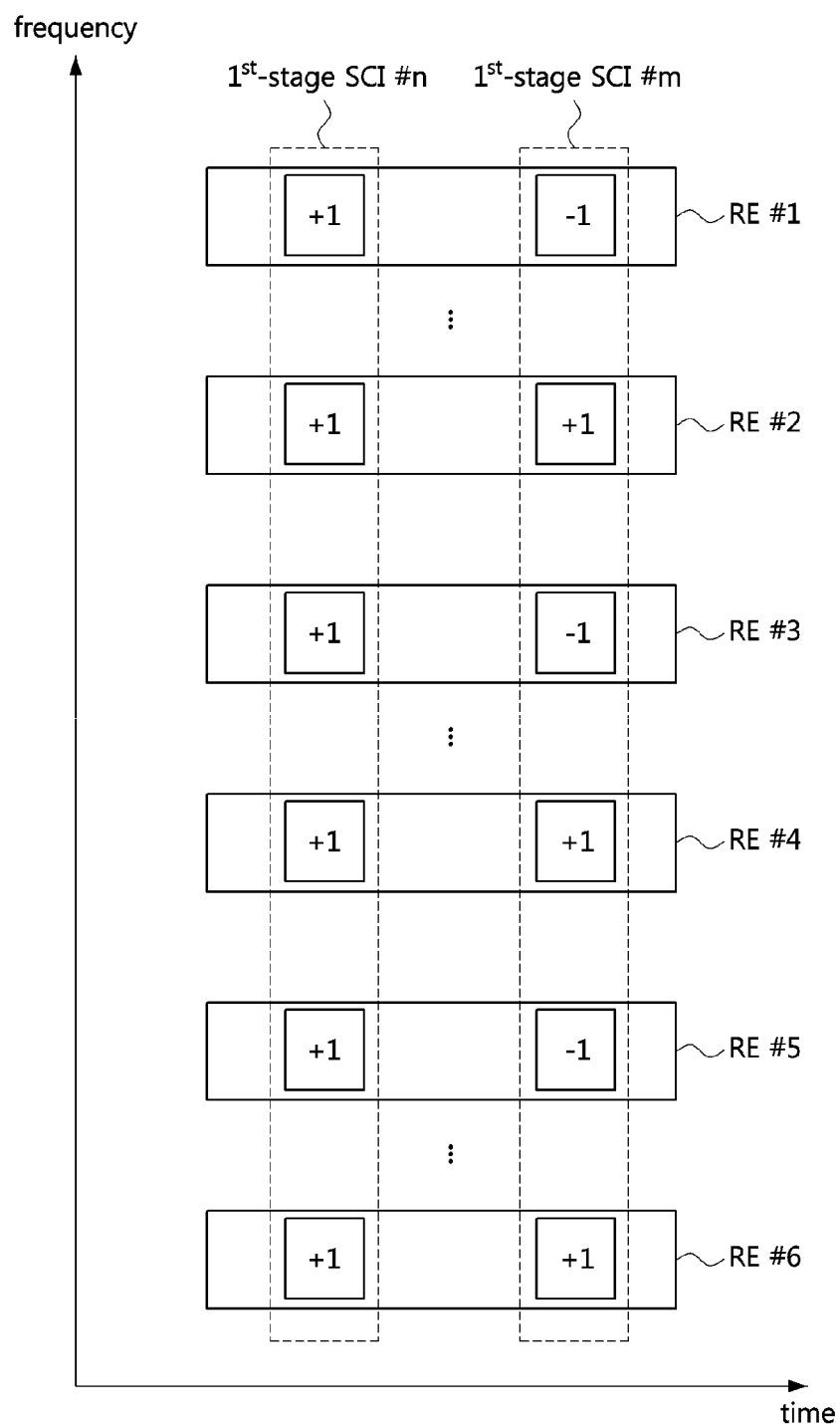
FIG. 21 is a conceptual diagram illustrating a second exemplary embodiment of reference signals in a communication system supporting sidelink communication.

FIG. 21 is a conceptual diagram illustrating a second exemplary embodiment of reference signals in a communication system supporting sidelink communication.

As shown in FIG. 21, a reference signal for 1st-stage SCI #n and a reference signal for 1st-stage SCI #m may be mapped to the same physical resource(s) (e.g., the same RE(s)). The reference signal of each of the 1st-stage SCIs #n and #m may be mapped to six REs. The reference signal may be mapped to REs arranged at regular intervals in the frequency domain. The receiving terminal may estimate each channel state based on the reference signal(s) obtained from REs belonging to a specific resource region. For example, the receiving terminal may estimate one channel state based on reference signals obtained from REs #1 and #2, and the corresponding channel state may be used as a representative channel state for the resource region (e.g., frequency resource region) to which the RE #1 and #2 belong.

The receiving terminal may estimate one channel state based on reference signals obtained from REs #3 and #4, and the corresponding channel state may be used as a representative channel state for the resource region (e.g., frequency resource region) to which the RE #3 and #4 belong. The receiving terminal may estimate one channel state based on reference signals obtained from REs #5 and #6, and the corresponding channel state may be used as a representative channel state for the resource region (e.g., frequency resource region) to which the RE #5 and #6 belong. The receiving terminal may improve the accuracy of channel estimation by performing an interpolation operation on the estimated channel state(s) (e.g., representative channel state (s)). The receiving terminal may perform the SCI reception operation based on the estimated channel state.

The above-described method may be a method of estimating the channel state for each SCI (e.g., 1st-stage SCI, 2nd-stage SCI) based on the reference signals (e.g., a plurality of REs to which the reference signals are mapped). The reference signals shown in FIG. 20 and/or the reference signals shown in FIG. 21 may be extended and applied even when the number of SCIs (e.g., 1st-stage SCI, 2nd-stage SCI) increases. The pattern of the reference signal (e.g., [+1, −1], [+1, +1], [−1, −1]) may be configured as various combinations to estimate the channel state for SCI (e.g., 1st-stage SCI, 2nd-stage SCI). When three SCIs (e.g., 1st-stage SCI, 2nd-stage SCI) are transmitted, the reference signals may be configured as follows.

Figure 22:
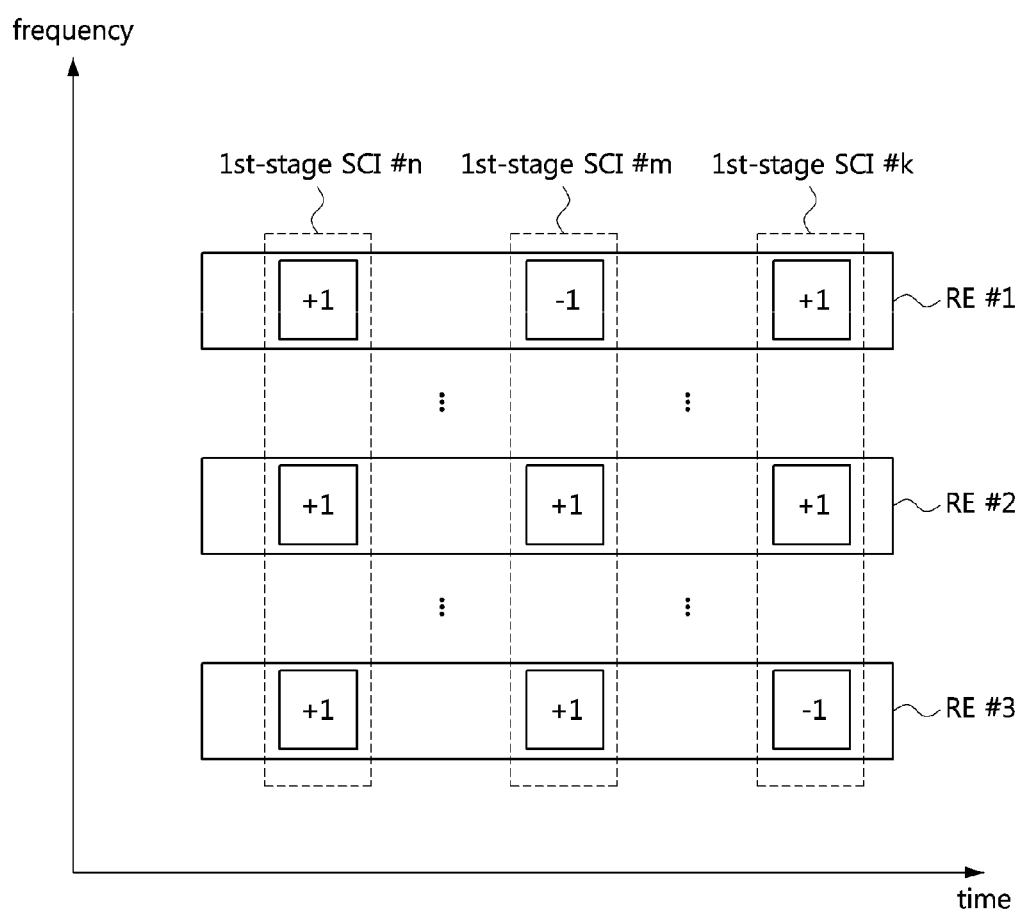
FIG. 22 is a conceptual diagram illustrating a third exemplary embodiment of reference signals in a communication system supporting sidelink communication.

FIG. 22 is a conceptual diagram illustrating a third exemplary embodiment of reference signals in a communication system supporting sidelink communication.

As shown in FIG. 22, reference signals for 1st-stage SCIs #n, #m, and #k may be mapped to the same physical resource(s) (e.g., the same RE(s)). The reference signals for the 1st-stage SCIs #n, #m, and #k may be mapped to at least three REs. The receiving terminal may use the reference signals mapped to at least three REs to estimate a channel state (e.g., a channel state for a frequency resource region) for each of the 1st-stages SCI #n, #m, and #k. The receiving terminal may perform an SCI reception operation based on the estimated channel states.

Figure 23:
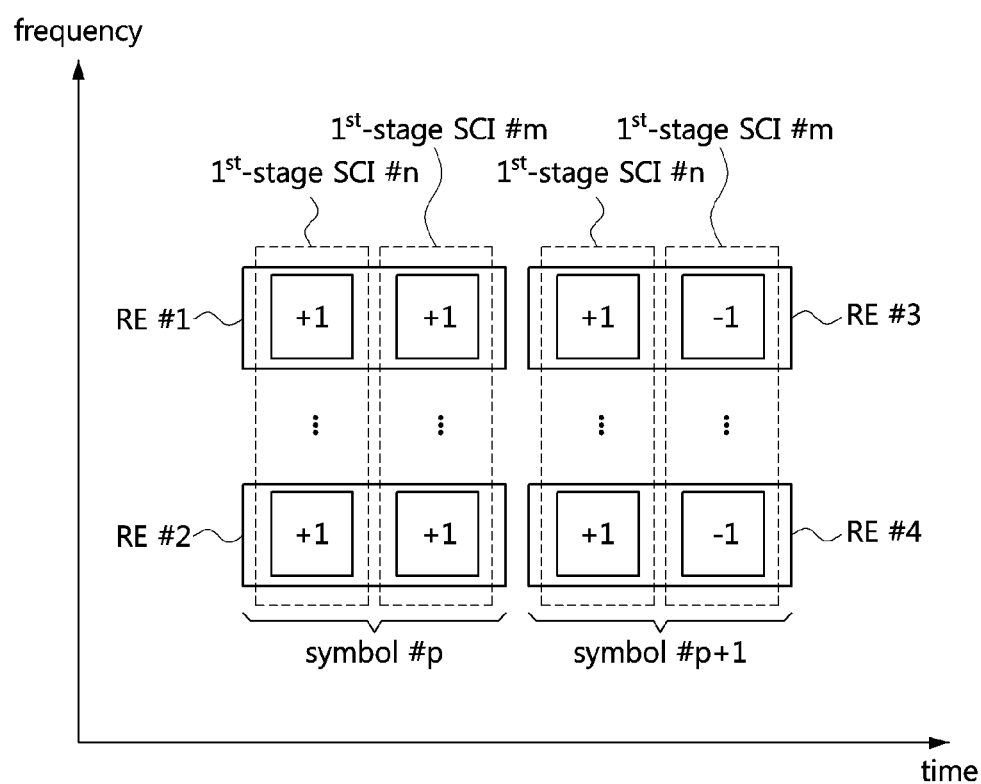
FIG. 23 is a conceptual diagram illustrating a fourth exemplary embodiment of reference signals in a communication system supporting sidelink communication.

FIG. 23 is a conceptual diagram illustrating a fourth exemplary embodiment of reference signals in a communication system supporting sidelink communication.

As shown in FIG. 23, reference signals for 1st-stage SCIs #n and #m may be mapped to two consecutive symbols. The reference signal (+1) for the 1st-stage SCI #n and the reference signal (+1) for the 1st-stage SCI #m may be mapped to REs #1 and #2 in a symbol #p. The reference signal (+1) for the 1st-stage SCI #n and the reference signal (−1) for the 1st-stage SCI #m may be mapped to REs #3 and #4 in a symbol #p+1. Here, p may be a natural number. The receiving terminal may estimate channel states based on the reference signal(s), and may perform an SCI reception operation based on the estimated channel states. The reference signal mapping method shown in FIG. 23 may be applied to the exemplary embodiments shown in FIGS. 20 to 22.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method for operating a first terminal in a communication system supporting sidelink communication, the method comprising:

receiving, from a base station, information on configuration for a resource pool;

selecting at least one resource in the resource pool;

generating first-stage sidelink control information (SCI) including information for scheduling of physical sidelink shared channel (PSSCH) and second-stage SCI on the PSSCH;

generating the second-stage SCI associated with the first-stage SCI;

transmitting the first-stage SCI to a second terminal in a first resource region on physical sidelink control channel (PSCCH); and transmitting, to the second terminal, data and the second-stage SCI in a second resource region on the PSSCH, wherein the first-stage SCI includes resource allocation information and modulation and coding scheme (MCS) information of the second-stage SCI, wherein the resource allocation information includes an offset between the first resource region for the first-stage SCI and the second resource region for the second-stage SCI, and wherein at least one of the first resource region or the second resource region is included in the at least one resource in the resource pool.

2. The method according to claim 1, wherein the first resource region and the second resource region belong to an SCI occasion, and the first resource region and the second resource region are contiguous physical resources within the SCI occasion.

3. The method according to claim 1, wherein a size of the second resource region is determined according to a resource allocation format of the second-stage SCI, and the resource allocation format is indicated by higher layer signaling.

4. The method according to claim 1, wherein a first reference signal used for demodulation of the first-stage SCI is transmitted in the first resource region, and a second reference signal used for demodulation of the second-stage SCI is transmitted in the second resource region.

5. The method according to claim 4, wherein the first reference signal and the second reference signal are mapped to same physical resources.

6. A first terminal in a communication system supporting sidelink communication, the first terminal comprising:
- a transceiver; and
- a processor coupled to the transceiver and configured to:
  - receive, from a base station, information on configuration for a resource pool;
  - select at least one resource in the resource pool;
  - generate first-stage sidelink control information (SCI) including information for scheduling of physical sidelink shared channel (PSSCH) and second-stage SCI on the PSSCH;
  - generate the second-stage SCI associated with the first-stage SCI;
  - transmit the first-stage SCI to a second terminal in a first resource region on physical sidelink control channel (PSCCH); and
  - transmit, to the second terminal, data and the second-stage SCI in a second resource region on the PSSCH, wherein the first-stage SCI includes resource allocation information and modulation and coding scheme (MCS) information of the second-stage SCI, wherein the resource allocation information includes an offset between the first resource region for the first-stage SCI and the second resource region for the second-stage SCI, and wherein at least one of the first resource region or the second resource region is included in the at least one resource in the resource pool.

7. The first terminal of claim 6, wherein the first resource region and the second resource region belong to an SCI occasion, and the first resource region and the second resource region are contiguous physical resources within the SCI occasion.

8. The first terminal of claim 6, wherein a size of the second resource region is determined according to a resource allocation format of the second-stage SCI, and the resource allocation format is indicated by higher layer signaling.

9. The first terminal of claim 6, wherein a first reference signal used for demodulation of the first-stage SCI is transmitted in the first resource region, and a second reference signal used for demodulation of the second-stage SCI is transmitted in the second resource region.

10. The first terminal of claim 9, wherein the first reference signal and the second reference signal are mapped to same physical resources.

* * * * *